(12) United States Patent
Harakawa et al.

(10) Patent No.: US 8,907,526 B2
(45) Date of Patent: Dec. 9, 2014

(54) POWER SUPPLY SYSTEM, AND FIXED BODY AND MOVABLE BODY THEREFOR

(75) Inventors: Kenichi Harakawa, Chiba (JP); Yuuji Oshi, Chiba (JP)

(73) Assignee: EXH Corporation, Chiba (JP)

( * ) Notice: Subject to any disclaimer, the term of this patent is extended or adjusted under 35 U.S.C. 154(b) by 682 days.

(21) Appl. No.: 13/201,803

(22) PCT Filed: Feb. 19, 2010

(86) PCT No.: PCT/JP2010/001071
§ 371 (c)(1),
(2), (4) Date: Oct. 28, 2011

(87) PCT Pub. No.: WO2010/095448
PCT Pub. Date: Aug. 26, 2010

(65) Prior Publication Data
US 2012/0038223 A1 Feb. 16, 2012

(30) Foreign Application Priority Data

Feb. 20, 2009 (JP) .................................. 2009-038329

(51) Int. Cl.
*H01F 38/04* (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| 6,611,199 | B1 | 8/2003 | Geiszler et al. |
| 2009/0067198 | A1 * | 3/2009 | Graham et al. ................ 363/8 |

FOREIGN PATENT DOCUMENTS

| JP | H05-038232 | 5/1993 |
| JP | 09093704 | 4/1997 |
| JP | 9312942 A | 12/1997 |
| JP | 2005168232 | 6/2005 |
| JP | 2009089520 A | 4/2009 |

OTHER PUBLICATIONS

International Search Report and Written Opinion of the International Searching Authority, mailed May 18, 2010, in counterpart International Patent Application No. PCT/JP2010/001071, 6 pages.

(Continued)

*Primary Examiner* — Robert L. DeBeradinis
(74) *Attorney, Agent, or Firm* — Brian J. Colandreo; Jeffrey T. Placker; Holland & Knight LLP

(57) ABSTRACT

Provided is a power supply system which makes it possible to stably supply power regardless of changes in placement of electrodes. The power supply system for supplying power to a load (24). The fixed body (10) includes: a first power-transmitting electrode (12) and second power-transmitting electrode (13); and an AC power supply (11) to supply AC power to the first power-transmitting electrode (12) and second power-transmitting electrode (13). The movable body (20) includes: a first power-receiving electrode (21*a*) and second power-receiving electrode (21*b*) to form a first coupling capacitor (30) and a second coupling capacitor (31), respectively, by being placed in a manner opposed to and not contacting corresponding ones of the first power-transmitting electrode (12) and second power-transmitting electrode (13) while facing one side of an interface, the one side not being faced by these power-transmitting electrodes, and a first capacitor (22*a*) and first coil (22*b*) connected to one another in parallel between the first power-receiving electrode (21*a*) and second power-receiving electrode (21*b*). The AC power supply (11) transmits power to the load (24) via the first and second coupling capacitors under a condition that causes parallel resonance between the first capacitor (22*a*) and first coil (22*b*).

9 Claims, 11 Drawing Sheets

(56) References Cited

OTHER PUBLICATIONS

T. Sekitani, et al., "A Large-area wireless power-transmission sheet using printed organic transistors and plastic MEMS switches", Jun. 2007, Nature Materials, pp. 413-417, vol. 6.

Supplementary European Search Report issued in European Patent Application No. EP 10 74 3577 mailed on Sep. 27, 2013.

Hu, Aiguo Patrick, et al, "A Novel Contactless Battery Charging System for Soccer Playing Robot", 15th International Conference on Mechatronics and Machine Vision in Practice (M2VIP08), Dec. 2-4, 2008, Auckland, New Zealand.

* cited by examiner (a)

(b)

(a)

(b)

POWER SUPPLY SYSTEM, AND FIXED BODY AND MOVABLE BODY THEREFOR

RELATED APPLICATIONS

The subject application is a U.S. National Stage application of International Application No PCT/JP2010/001071, filed on 19 Feb. 2010, which claims the priority of Japanese Patent Application No.: 2009-038329, filed on 20 Feb. 2009, the contents of which are herein incorporated by reference in its entirety.

TECHNICAL FIELD

The present invention relates to a power supply system for supplying electric power to various loads, and also relates to a movable body and fixed body therefor.

BACKGROUND ART

In general, a power supply system, which supplies power to various loads placed on a floor surface, is either of the followings in a broad sense: a contact-type power supply system configured to supply power by bringing electrodes, which are provided in a manner exposed over the floor surface, into direct contact with electrodes provided on the bottom surface of a load; and a contactless power supply system configured to supply power without bringing electrodes, which are provided in an unexposed state underneath a floor surface, into direct contact with electrodes of a load.

Patent Document 1, for example, discloses a conventional one of such contactless power supply systems. This system supplies power to a load (aboveground movable body) that moves along a guideway. The system is configured in such a manner that, while an induction line is arranged along the guideway, an iron core wounded with a coil is provided to the aboveground movable body. Then, power is supplied to the aboveground movable body when electromagnetic induction, with the induction line being the primary side and the coil being the secondary side, is generated when a high-frequency current is flown through the induction line.

Non-patent Document 1 also discloses a wireless power transmission sheet as another contactless power supply system. This wireless power transmission sheet is configured in such a manner that power-transmitting coils, an MEMS (Micro Electro Mechanical Systems) switch used for controlling power, a position detection coil used for detecting the position of a power-receiving device, and an organic transistor to perform position detection by using the position detection coil are formed on a plastic film by use of printing techniques. This wireless power transmission sheet uses the organic transistor to detect a change in inductance of the position detection coil, thereby identifying the position of an electronic device that has approached, the change accompanying the approach of the electronic device to the sheet. Further, the wireless power transmission sheet selects one of the power-transmitting coils by using the MEMS switch, and transmits power through the thus selected power-transmitting coil, the one corresponding to the thus identified position.

In order to obtain higher power transmission efficiency, however, the conventional contactless power supply system as described above requires a lot of positional restrictions including the need for closely positioning an induction line and a coil, and the need for aligning these induction line and coil with each other so that a magnetic flux generated by electrical conduction through the induction line may pass through the central axis of the coil. Therefore, there has been a problem that, since power supply has been possible only on a fixed route such as a guideway, power supply to a movable body such as a robot that needs to freely move on a floor surface has been impossible. Further, a magnetic body such as an iron core should be used in forming a magnetic path, which raises another problem that the system is made heavy, and produces noise due to magnetostriction generated in altering-current energization of the magnetic body. On the other hand, the conventional wireless power transmission sheet also has a lot of positional restrictions for the purpose of achieving higher power transmission efficiency, the restrictions including the need for aligning the positions of the power-transmitting coil and a power-receiving coil of the electronic device with each other. Further, the conventional wireless power transmission sheet employs a lot of switches, and therefore, there is a possibility of reliability degradation. Although another possible type of contactless power supply system is one that supplies power through electromagnetic waves, the use of electromagnetic waves is strictly regulated so that danger to human bodies and malfunctions of electronic devices may be avoided. Installation of this type of contactless power supply system has been therefore difficult to be installed in a place to have people inside, such as an office space.

In consideration of the above described issues, the present applicants proposed a power supply system that uses neither electromagnetic induction nor electromagnetic waves, and is still capable of contactless power supply by using series resonance (refer to Patent Document 2 but note that, as of the filing date of the present application, the power supply system thereof was not publicly known as Patent Document 2 had not been disclosed). The summary of this power supply system will be described below.

FIG. 11 shows a vertical cross-sectional view of essential parts of the conventional power supply system as described above. This power supply system is a power supply system for supplying power, via a movable body 103 arranged in a power-consuming region 102, to a load 104 from a fixed body 101 placed in a power-supplying region 100. The fixed body 101 includes a first power-transmitting electrode 105 and a second power-transmitting electrode 106, which are arranged at positions in the neighborhoods of the interface between the power-supplying region 100 and the power-consuming region 102. The movable body 103 is supposed to be placed at a position in the neighborhood of the interface, and includes a first power-receiving electrode 107 and a second power-receiving electrode 108, which are placed in a manner opposed to and not contacting the first power-transmitting electrode 105 or the second power-transmitting electrode 106. The first and second power-transmitting electrodes 105 and 106 and the first and second power-receiving electrodes 107 and 108, in combination, form coupling capacitors 109. Each of these coupling capacitors 109 in combination with a coil 110 forms a series resonance circuit. This configuration enables highly efficient power supply from the fixed body 101 to the movable body 103. Specifically, this configuration makes the following case possible. With a large number of the fixed bodies 101 each as described above being arranged side by side under a floor board 111, power is continuously supplied to the movable body 103 in a contactless manner at the same time as the movable body 103 is caused to travel and move on this floor board 111.

In this power supply system, an AC power supply 115, the frequency of which is controllable by switching, is provided to the fixed body 101. This AC power supply 115 supplies AC power to the first power-transmitting electrode 105 and second power-transmitting electrode 106, the AC power having a desired frequency.

Additionally, for the purpose of performing power supply control, this power supply system is configured to have the function of enabling communication between the fixed body 101 and movable body 103. Specifically, a communication unit 112 is provided to each of the fixed bodies 101, and a communication unit 113 is provided to the movable body 103. A power supply request signal is transmitted from the communication unit 113 of the movable body 103. Each of the fixed bodies 101, upon receiving the power supply request signal through the communication unit 112 thereof, deems the movable body 103 to be located above itself and perform power supply control.

Nevertheless, even though the fixed body 101 is enabled to determine whether the movable body 103 is located above itself, this does not necessarily allow determination, when the movable body 103 moves in random direction, as to which of the first power-receiving electrodes 107 and second power-receiving electrodes 108 is an electrode placed in a manner opposed to the first power-transmitting electrode 105, and as to which of the first power-receiving electrodes 107 and second power-receiving electrodes 108 is an electrode placed in a manner opposed to the second power-transmitting electrode 106. To make this determination possible, a connection section 114 having multiple diodes is used for rectification, whereby continuous power supply is enabled in a manner suited for the polarity of the load 104 regardless of how each of the electrodes is opposed to another one thereof. With the diodes being thus arranged in the movable body 103, provision of the coil 110 between the diodes and the load 104 would make it impossible to cause series resonance between the coil 110 and the coupling capacitor 109 because the diodes would rectify currents. In order to avoid this situation, the coil 110 is arranged in the fixed body 101 side.

This power supply system eliminates the need for exposing the first and second power-transmitting electrodes 105 and 106 to the power-consuming region 102, which facilitates installation thereof in a place to have people inside. Further, this power supply system is capable of supplying power as long as each of the electrodes is placed in a manner opposed to another one thereof with a distance therebetween which makes these electrodes close enough to produce a desired capacitor capacity therebetween. This capability eliminates the need for strict alignment as has been done in the case of a power supply system using electromagnetic induction, and therefore enables power supply to the movable body 103 even in a case where the movable body 103 is a robot.

PRIOR ART DOCUMENTS

Patent Documents

Patent Document 1: Japanese Patent Application Publication No. 9-93704
Patent Document 2: Japanese Patent Application No. 2007-256369

Non-Patent Document

Non-patent Document 1: "Nature Materials", Vol. 6, p.p. 413-417 (T. Sekitani et al., 2007)

SUMMARY OF THE INVENTION

Problems to be Solved by the Invention

However, the power supply system of the Patent Document 2 produces problems when the respective power-receiving electrodes are placed while overlapping only parts of the power-transmitting electrodes since the movable body is not placed at a position that allows the power-transmitting electrodes to perfectly correspond to the power-receiving electrodes in the vertical direction. The problems includes: reduced power transmission efficiency caused because predetermined series resonance conditions are unsatisfied; and the necessity of satisfying the series resonance conditions by shifting the oscillation frequency in accordance with how the respective electrodes are placed.

Consequently, the present invention aims at providing a power supply system which makes it possible to stably supply power regardless of changes in the placement of the electrodes. The present invention also aims at providing a movable body and fixed body configured to be included in such a power supply system.

In order to eliminate the above problems and achieve the aims, claim 1 provides a power supply system for supplying power from a fixed body placed in a power-supplying region, via a movable body placed in a power-consuming region, to a predetermined load, wherein the fixed body includes: a first power-transmitting electrode and second power-transmitting electrode to which AC power is supplied and are configured to be placed at a position in the neighborhood of the interface between the power-supplying region and power-consuming region; and an AC power supply to supply power to the first power-transmitting electrode and second power-transmitting electrode, wherein the movable body includes: a first power-receiving electrode and second power-receiving electrode to be placed in a manner opposed to and not contacting the first power-transmitting electrode and second power-transmitting electrode with the interface interposed therebetween; a first capacitor and first coil connected to each other in parallel between the first power-receiving electrode and second power-receiving electrode, wherein, while a first coupling capacitor is formed when one of the first power-receiving electrode and second power-receiving electrode is placed in a manner opposed to the first power-transmitting electrode, a second coupling capacitor is formed when the other one of the first power-receiving electrode and second power-receiving electrode is placed in a manner opposed to the second power-transmitting electrode, wherein the AC power supply transmits power to the load via the first and second coupling capacitors under a condition that causes parallel resonance between the first capacitor and first coil.

Further, claim 2 provides the power supply system of claim 1, wherein: the fixed body further includes a second capacitor and second coil connected to each other in parallel between the first power-transmitting electrode and second power-transmitting electrode; and the AC power supply supplies power to the load under a condition that causes parallel resonance between the second capacitor and second coil.

Further, claim 3 provides the power supply system of claim 2, wherein: the fixed body further includes a third capacitor and third coil connected to each other in parallel in such a manner that the third capacitor and third coil are laid parallel to the first and second power-transmitting electrodes and to the second capacitor and second coil; the second and third coils are arranged in a manner that enables transformation of the voltages thereof due to mutual induction; and the AC power supply supplies power to the load via the third coil under a condition that causes parallel resonance between the third capacitor and third coil.

Further, claim 4 provides the power supply system of any one of claims 1 to 3, wherein: the movable body further includes a fourth capacitor and fourth coil connected to each other in parallel in such a manner that the fourth capacitor and fourth coil are laid parallel to the first capacitor, the first coil and the load; the first and fourth coils are arranged in a manner that enables transformation of the voltages thereof due to mutual induction; and the AC power supply supplies power to the load via the fourth coil under a condition that causes parallel resonance between the fourth capacitor and fourth coil.

Further, claim 5 provides the power supply system of claims 1 wherein: the multiple first power-transmitting electrodes and the multiple second power-transmitting electrodes are provided to the fixed body along the foregoing interface in parallel; connection means, which electrically connects the first power-receiving electrode and the second power-receiving electrode to the load, is provided to the movable body, the connection means being configured to enable electric conduction from any one of the first power-receiving electrode and second power-receiving electrode to one electrode of the load, and electric conduction from the other electrode of the load to the other one of the first power-receiving electrode and second power-receiving electrode when, while the one of the first power-receiving electrode and second power-receiving electrode is placed in a manner opposed to the first power-transmitting electrode, the other one of the first power-receiving electrode and second power-receiving electrode is placed in a manner opposed to the second power-transmitting electrode, the connection means being further configured to enable electric conduction from the other one of the first power-receiving electrode and second power-receiving electrode to the one electrode of the load, and electric conduction from the other electrode of the load to the other one of the first power-receiving electrode and second power-receiving electrode when, while the one of the first power-receiving electrode and second power-receiving electrode is placed in a manner opposed to the second power-transmitting electrode, the other one of the first power-receiving electrode and second power-receiving electrode is placed in a manner opposed to the first power-transmitting electrode.

Further, the disclosure provides the power supply system of any one of claims 2 and 5, wherein the fixed body includes the second capacitor and second coil of claim 2 corresponding to each set of the first power-transmitting electrode and second power-transmitting electrode.

Further, claim 6 provides the power supply system, wherein conditions that cause parallel resonance in the respective sets of the second capacitors and second coils are made different from one another.

Further, claim 7 provides a movable body to be placed in a power-consuming region and to supply power to a predetermined load, the power having been supplied from a fixed body placed in a power-supplying region, including: a first power-receiving electrode and second power-receiving electrode, the first power-receiving electrode and second power-receiving electrode being a set of power-receiving electrodes to be placed in a manner opposed to and not contacting a first power-transmitting electrode or second power-transmitting electrode and with the interface, of the power-supplying region and power-consuming region, having the pair of power-receiving electrodes on one side and the first power-transmitting electrode and second power-transmitting electrode on the other side, the first power-transmitting electrode and second power-transmitting electrode being those arranged in the fixed body and to which AC power is supplied, wherein, while a first coupling capacitor is formed when one of the paired power-receiving electrodes is placed in a manner opposed to the first power-transmitting electrode, a second coupling capacitor is formed when the other one of the paired power-receiving electrodes is placed in a manner opposed to the second power-transmitting electrode; and a first capacitor and first coil connected to each other in parallel between the first and second power-receiving electrodes, wherein power is transmitted to the load via the first and second coupling capacitors under a condition that causes parallel resonance between the first capacitor and first coil.

Further, claim 8 provides a fixed body placed in a power-supplying region and configured to supply power to a predetermined load via a movable body placed in a power-consuming region, including: a plurality of first power-transmitting electrodes and plurality of second power-transmitting electrodes, which form capacitors with at least one set of power-receiving electrodes arranged in the movable body when being placed in a manner opposed to but not contacting this pair of power-receiving electrodes and with the interface, of the power-supplying region and power-consuming region, having the pluralities of first power-transmitting electrodes and second power-transmitting electrodes on one side and the paired power-receiving electrodes on the other; and an AC power supply to supply power to the first and second power-transmitting electrodes, wherein the AC power supply transmits power to the load via the first and second coupling capacitors under a condition that causes parallel resonance between a first capacitor and first coil, which are connected to each other in parallel between the first and second power-receiving electrodes in the movable body.

Further, claim 9 provides the fixed body of claim 8, wherein the first power-transmitting electrodes and second power-transmitting electrodes are provided along the foregoing interface in such a manner that the respective first power-transmitting electrodes are side by side with the second power-transmitting electrodes.

Effects of the Invention

The power supply system of claim 1, the movable body of claim 7 or the fixed body of claim 8 makes it possible to supply power without bringing the power-transmitting electrodes into contact with the power-receiving electrodes, and therefore eliminates the need for exposing the power-transmitting electrodes to the power-consuming region, whereby the power supply system, the movable body or the fixed body can eliminate the danger of giving an electrical shock to a human body when the human body touches a power-transmitting electrode, and can relieve the psychological anxiety. For this reason, installation thereof in a place to have people inside, such as an office space, is facilitated. Particularly, the first capacitor and first coil connected to each other in parallel between the first power-receiving electrode and second power-receiving electrode are provided to the movable body, and power is supplied to the load under the condition that causes parallel resonance between the first capacitor and first coil. Therefore, the impedance of a load section, which includes the first capacitor, the first coil and the load, can be increased. As a result, the first coupling capacitor and second coupling capacitor are less likely to have a voltage drop, and stable power supply is made possible regardless of changes in capacitances of the first coupling capacitor and second coupling capacitor.

Further, in the power supply system of claim 2, the second capacitor and second coil connected to each other in parallel between the first power-transmitting electrode and second power-transmitting electrode are provided to the fixed body, whereby it is made possible to reduce the amount of reactive current to be output from the AC power supply. This enables the AC power supply to be more compact.

Further, in the power supply system of claim 3, the third capacitor and third coil connected to each other in parallel are provided to the movable body, in such a manner as to be laid parallel to the first and second power-transmitting electrodes and to the second capacitor and second coil, whereby it is made possible to reduce the amount of reactive current to be output from the AC power supply. This enables the AC power supply to be more compact. Additionally, power is transmitted under the action of mutual induction generated between the second and third coils, whereby it is made possible to supply power to the load with the output voltage from the AC power supply stepped up.

Further, in the power supply system of claim 4, the fourth capacitor and fourth coil connected to each other in parallel are provided to the movable body in such a manner as to be laid parallel to the first capacitor, first coil and load, whereby it is made possible to reduce the amount of reactive current to be output from the AC power supply. This enables the AC power supply to be more compact. Additionally, power is transmitted under the action of mutual induction between the first coil and fourth coil, whereby it is made possible to supply power to the load with the input voltages to the first and second power-receiving electrodes transformed.

Further, in the power supply system of claim 5 or the fixed body of claim 9, the plurality of first power-transmitting electrodes are provided side by side with the plurality of second power-transmitting electrodes, and the connection state of each of the first power-transmitting electrodes and second power-transmitting electrodes to the load is automatically switched by connection means based on which ones of the first power-transmitting electrodes and second power-transmitting electrodes opposed to the first power-receiving electrodes and second power-receiving electrodes, whereby power supply is enabled even when the movable body is placed at an arbitrary position with respect to the fixed body.

Further, in the power supply system of of the disclosure, the second capacitor and second coil of claim 2 are provided to each set of the first power-transmitting electrode and second power-transmitting electrode, whereby it makes it possible to reduce the amount of reactive current to be output from the AC power supply, and to make the AC power supply more compact.

Further, in the power supply system of claim 6, the conditions that cause parallel resonance in the respective sets of the second capacitors and second coils are made different from one another, whereby it is made possible to, only by changing the output frequency of the AC power supply, cause resonance in an arbitrary set of the second capacitor and the second coil and supply power only to the first power-transmitting electrode and second power-transmitting electrode that includes these second capacitor and second coil. This makes it unnecessary that any circuit such as a switch for switching between the sets of the first power-transmitting electrodes and second power-transmitting electrodes for supplying power should be provided to the fixed body. As a result, the reliability of the system can be improved.

BEST MODES FOR CARRYING OUT THE INVENTION

Figure 1:
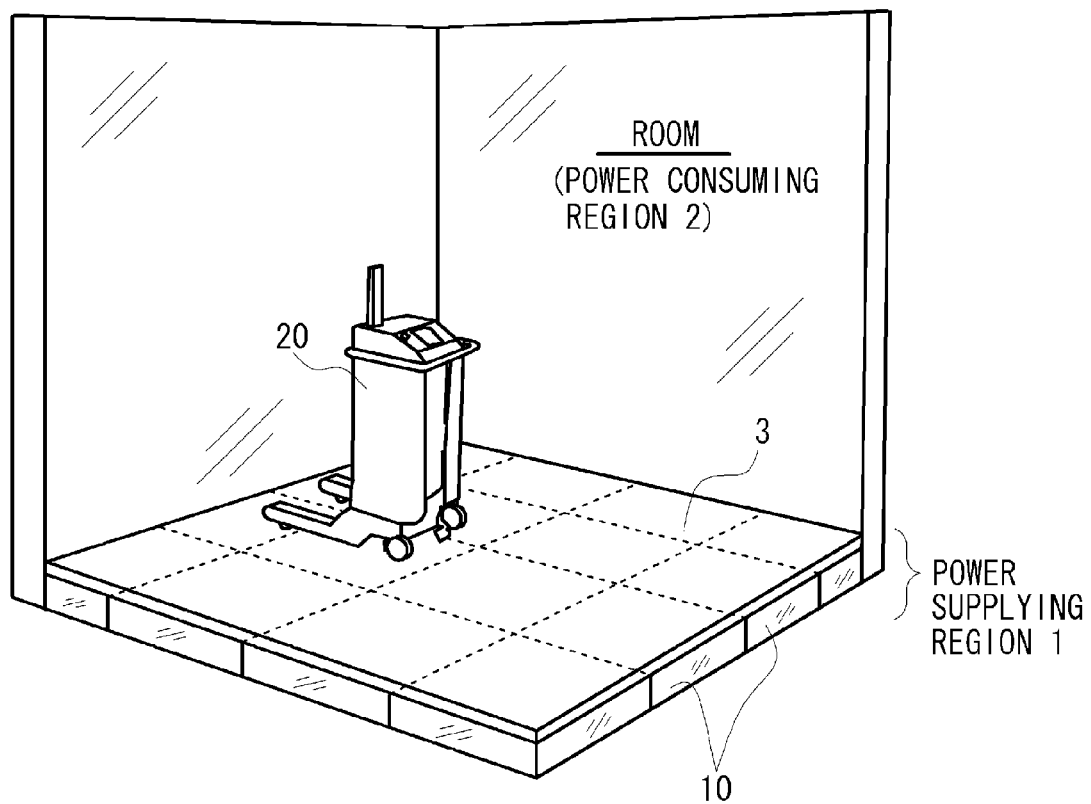
FIG. 1 is a perspective view of a room to which a power supply system according to Embodiment 1 is applied.

With reference to the accompanying drawings, embodiments for a power supply system, a movable body and a fixed body according to the present invention will be described below in detail while the drawings are used for reference. The following descriptions will be given in sequence: {I} Fundamental concepts common to all of the embodiments; then, {II} Specific details of the respective embodiments; and finally, {III} Variations based on the embodiments. Note that the present invention should not be limited to these embodiments.

{I} Fundamental Concepts Common to all of the Embodiments

First, fundamental concepts common to all of the embodiments will be described. Any one of the embodiments provides a power supply system for supplying power, to a movable body placed in a power-consuming region, from a fixed body placed in a power-supplying region. The power-supplying region and power-consuming region may take any specific configurations. Examples of each of these regions include: an internal space of a building such as a typical house or office building; an internal space of a vehicle such as a train or airplane; and an outdoor space. Hereinafter, a face that separates the power-supplying region and power-consuming region from each other will be referred to as an interface. For example, in a case where the power-consuming region and power-supplying region are configured as a room of a building and the floor part of the room, respectively, an upper surface (floor surface) of this floor part is deemed to be the interface.

The fixed body may be one internally provided with a power supply, one that supplies, to the movable body, power received from an external power supply, or the like. Although being configured to be placed in the power-supplying region, this fixed body is not limited to one that should be permanently immovably fixed, and may be one that can be removed from the power-supplying region when not in use, one that can be moved to an arbitrary position inside the power-supplying region, or the like. Particularly, the fixed body is not limited to one that is fixed at any time as a whole, and examples of thereof include one in which the positions of some components thereof can be adjusted as necessary to change the relative positional relations thereof with respect to the movable body.

The movable body may be one (a stationary body) that is used while being immovably placed in the power-consuming region, and one (a moving body) that moves inside the power-consuming region as necessary. While functions and a specific configuration taken by this movable body are arbitrary unless otherwise stated particularly, apparatuses such as a computer and a household electric appliance can be cited as examples of the stationary body, whereas a robot and an electric vehicle can be cited as examples of the moving body.

In the thus configured power supply system, power is supplied from the fixed body to the movable body in a contactless manner. Roughly speaking, this contactless power supply is carried out by use of a capacitor placed in such a manner as to straddle the interface. That is, when a power-transmitting electrode provided to the fixed body, and a power-receiving electrode provided to the movable body are placed in a manner facing opposite sides of the interface and in a manner opposed to and not contacting each other, the capacitor (hereinafter, referred to as "coupling capacitor") is formed. At least two capacitors are provided each as the thus formed coupling capacitor, and placed in power transmission paths, so that field-effect power transmission is carried out through these two coupling capacitors. This configuration makes it unnecessary to expose any power-transmitting electrode of the fixed body to the power-consuming region, and thereby makes it possible to provide the power supply system with higher degrees of safety and durability. Further, since plural electrodes are placed each as the power-transmitting electrode, continuous power supply to the movable body is allowed even when the movable body is moving, whereby free movement of the movable body can be ensured.

Particularly, one of the characteristics of each of the power supply systems according to the respective embodiments lies in, with a parallel resonance circuit being provided to the movable body, enabling power supply from the fixed body under a condition that causes parallel resonance in the parallel resonance circuit. This configuration makes it possible to reduce the impedances of the coupling capacitors to extremely low levels as compared with that of the parallel resonance circuit at the time when parallel resonance occurs therein, and thereby provide the system with an advantage of limiting the influence of changes in capacitance of the coupling capacitor on the power supply efficiency.

{II} Specific Details of the Embodiments

Next, the specific details of each of the embodiments will be described with respect to the power supply system, movable body and fixed body.

{Embodiment 1}

First, Embodiment 1 will be described. Embodiment 1 here is an embodiment in which the parallel resonance circuit is provided in the movable body side.

(Configuration)

FIG. 1 is a perspective view of a room to which a power supply system according to Embodiment 1 is applied. This embodiment is intended to show an example in which power is supplied, from a fixed body 10 placed in a power-supplying region (configured here as a space under a floor board 3) 1, to a movable body (configured here as a robot) 20 which moves in the inside of a power-consuming region (configured as a room) 2. The power supply system of this embodiment includes these fixed body 10 and movable body 20. Here, while the floor board 3 laid on an upper portion of the power-supplying region 1 corresponds to the interface of the power-supplying region 1 and power-consuming region 2, coupling capacitors 30 and 31 (not shown in FIG. 1) described later are formed in a manner straddling this floor board 3.

(Configuration—the Fixed Body)

Figure 2:
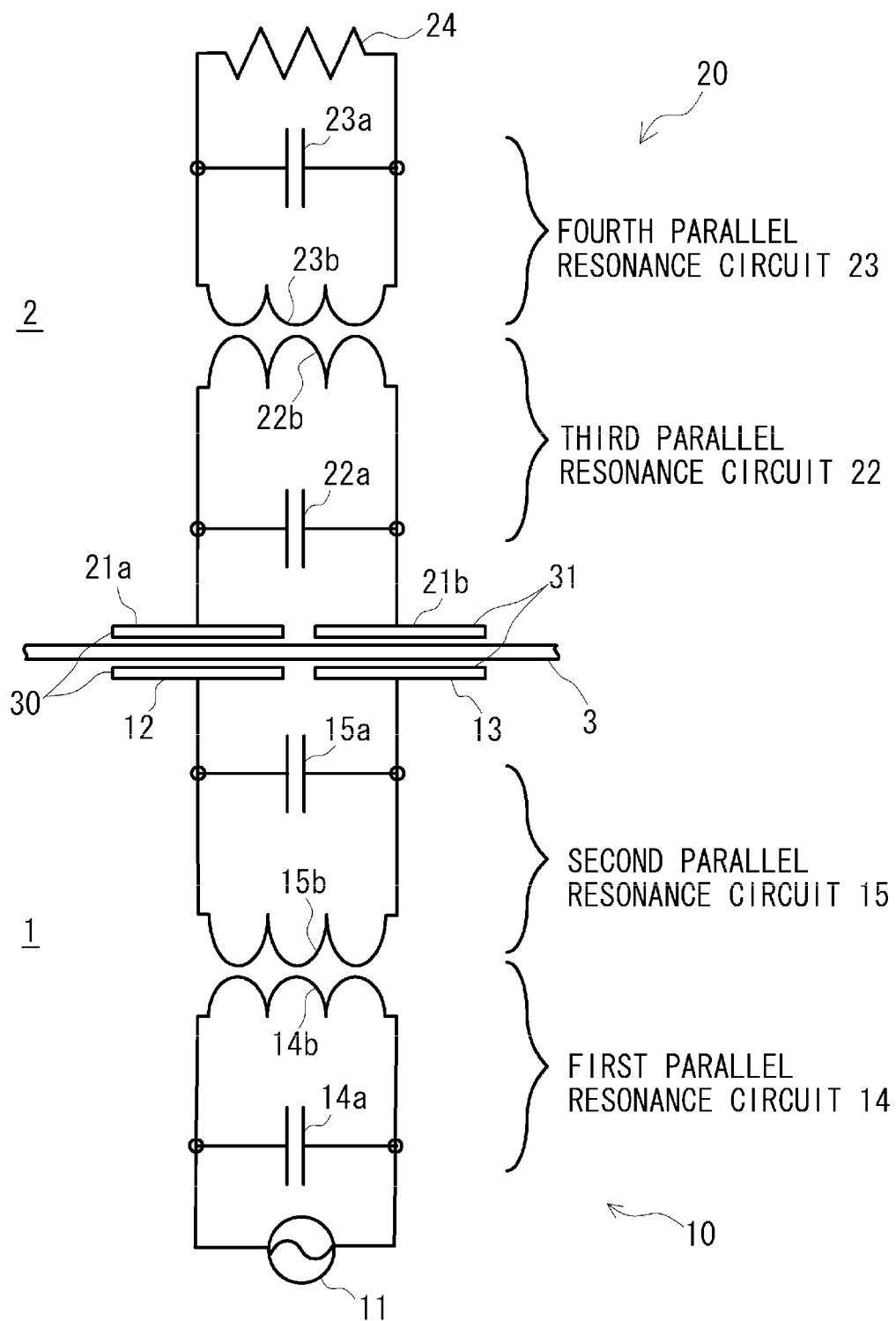
FIG. 2 is a vertical cross-sectional view schematically showing a fixed body and movable body shown in FIG. 1.

Next, the configuration of the fixed body 10 will be described. FIG. 2 is a vertical cross-sectional view schematically showing the fixed body 10 and movable body 20 of FIG. 1. This fixed body 10 includes an AC power supply 11, a first power-transmitting electrode 12, a second power-transmitting electrode 13, a first parallel resonance circuit 14 and a second parallel resonance circuit 15. FIG. 2 shows only the single fixed body 10. In a practical case, however, the multiple fixed bodies 10 are provided along the floor board 3 side by side with each other in the power-consuming region 2 as shown in FIG. 1.

The AC power supply 11 is a supply source for AC power. Although only the single AC power supply 11 is provided to the single fixed body 10 in FIG. 2, the AC power supply 11 may be configured to supply AC power to another fixed body provided as the fixed body 10 not shown in FIG. 2.

Each of the first power-transmitting electrode 12 and second power-transmitting electrode 13 is a flat-plate electric conductor, and is placed at a portion under and in the neighborhood of the floor board 3 and so as to be substantially parallel to the floor board 3. These first power-transmitting electrode 12 and second power-transmitting electrode 13 may be placed in direct contact with or a minute distance apart from the floor board 3. In either case, surfaces (here, the upper surfaces) of these first power-transmitting electrode 12 and second power-transmitting electrode 13 that are opposed to the power-consuming region 2 are completely covered by the floor board 3, whereby these first power-transmitting electrode 12 and second power-transmitting electrode 13 are not exposed to the power-consuming region 2. Note that, hereinafter, these first power-transmitting electrode 12 and second power-transmitting electrode 13 will be collectively referred to simply as "power-transmitting electrodes 12 and 13" where there is no need for distinction between these electrodes.

The first parallel resonance circuit 14 is configured to be connected to the AC power supply 11, and includes a second capacitor 14a and second coil 14b. The second capacitor 14a and second coil 14b are connected to each other in parallel to form a parallel resonance circuit.

The second parallel resonance circuit 15 is configured to be connected to the first power-transmitting electrode 12 and second power-transmitting electrode 13, and includes a third capacitor 15a and third coil 15b. The third capacitor 15a and third coil 15b are connected to each other in parallel to form a parallel resonance circuit. Additionally, the second coil 14b and third coil 15b are arranged parallel to and a predetermined distance apart from each other, and are arranged so that power transmission may be enabled by the action of mutual induction between the second coil 14b and third coil 15b. Additionally, the turn ratio between the second coil 14b and third coil 15b is set in order to supply power to the power-transmitting electrodes 12 and 13 with the output voltage of the AC power supply 11 stepped up at a desired transformation ratio.

(Configuration—the Movable Body)

Next, the configuration of the movable body 20 will be described. The movable body 20 includes a first power-receiving electrode 21a, a second power-receiving electrode 21b, a third parallel resonance circuit 22, a fourth parallel resonance circuit 23 and a load 24.

Each of the first power-receiving electrode 21a and second power-receiving electrode 21b is configured to receive power supplied from the fixed body 10, and configured as a flat-plate electric conductor. Hereinafter, these first power-receiving electrode 21a and second power-receiving electrode 21b will be collectively referred to simply as "power-receiving electrodes 21" where there is no need for distinction between these electrodes. These power-receiving electrodes 21 may be placed, substantially parallel to the floor board 3, at positions that bring these electrodes into direct contact with the upper surface of the floor board 3 or that are a minute distance apart from the floor board 3.

In this state, any one of the first power-receiving electrode 21a and second power-receiving electrode 21b (the first power-receiving electrode 21a in the case of FIG. 2) forms a first coupling capacitor 30 when being placed in a manner opposed to the first power-transmitting electrode 12 with the floor board 3 interposed therebetween. Additionally, the other one of the first power-receiving electrode 21a and second power-receiving electrode 21b (the second power-receiving electrode 21b in the case of FIG. 2) forms a second coupling capacitor 31 when being placed in a manner opposed to the second power-transmitting electrode 13 with the floor board 3 interposed therebetween. Hereinafter, these first coupling capacitor 30 and second coupling capacitor 31 will be collectively referred to simply as "coupling capacitors 30 and 31" where there is no need for distinction between these coupling capacitors. Here, since the power-transmitting electrodes 12 and 13 are not exposed to the power-consuming region 2, each of these power-transmitting electrodes 12 and 13 and any one of the power-receiving electrodes 21 are placed without contacting each other.

The third parallel resonance circuit 22 is configured to be connected to the first power-receiving electrode 21a and second power-receiving electrode 21b, and includes a first capacitor 22a and first coil 22b. The first capacitor 22a and first coil 22b are connected to each other in parallel to form a parallel resonance circuit.

The fourth parallel resonance circuit 23 is configured to be connected to the load 24, and includes a fourth capacitor 23a and fourth coil 23b. The fourth capacitor 23a and fourth coil 23b are connected to each other in parallel to form a parallel resonance circuit.

Additionally, the first coil 22b and fourth coil 23b are arranged parallel to and a predetermined distance apart from each other, and are arranged so that power transmission may be enabled by the action of mutual induction between the first coil 22b and fourth coil 23b. Further, the turn ratio between the first coil 22b and fourth coil 23b is set in order to supply power to the load 24 with the input voltages to the power-receiving electrodes 21 transformed at a desired transformation ratio.

The load 24 is configured to be driven by AC power, which is supplied thereto via the fourth parallel resonance circuit 23, and perform predetermined functions. For example, in a case where the movable body 20 is configured as a robot such as one shown in FIG. 1, a motor or control unit built into the robot corresponds to the load 24. Apart from that, the load 24 may take an arbitrary specific configuration, and, for example, may be configured as: a communication device to transmit and receive communication signals to and from a device outside of the movable body 20 wirelessly or via wire; an information processing device to process information of various kinds; a sensor to detect, in the power-consuming region 2, a predetermined object that should be detected and then output a signal to a predetermined device, the signal indicating the result of the detection; or a power supply (for example, a secondary battery) to transmit and receive power to and from a device outside of the movable body 20. Note that it is not necessarily required to provide the load 24 inside the movable body 20. Power supply to the load 24 may be carried out via the movable body 20 with the load 24 provided outside the movable body 20. Further, although FIG. 2 shows only the single load 24, power may be supplied to the plural loads 24 connected to each other in parallel or in series.

Here, the capacitances of the capacitors and the inductances of the coils in the respective parallel resonance circuits are set so that the first parallel resonance circuit 14, second parallel resonance circuit 15, third parallel resonance circuit 22 and fourth parallel resonance circuit 23 may have an common value $f_1$ as the parallel resonance frequencies thereof. Therefore, parallel resonance occurs in each of the parallel resonance circuits 14, 15, 22 and 23 when AC power is output from the AC power supply 11 under the conditions that cause parallel resonance in these parallel resonance circuits 14, 15, 22 and 23 (that is, AC power is output from the AC power supply 11 at a frequency equal to the value $f_1$ of the parallel resonance frequencies).

(Configuration—the Floor Board)

The floor board 3, which has the power-transmitting electrodes 12 and 13 on one side and the power-receiving electrodes 21 on the other side, is formed of an inductive material that enables formation of the coupling capacitors 30 and 31. For example, fluorine resin may be adopted as such an inductive material. This inductive material not only may be used for the floor board 3 but also may be applied as coating on surfaces of the power-transmitting electrodes 12 and 13 that are to be opposed to the power-receiving electrodes 21 or on surfaces of the power-receiving electrodes 21 that are to be opposed to the power-transmitting electrodes 12 and 13. Additionally, it is preferable that, as described above, a material used for the floor board 3 and a material used for coating on the power-transmitting electrodes 12 and 13 or the power-receiving electrodes 21 have an insulating capability for sustaining a required level of insulation performance between each of the power-transmitting electrodes 12 and 13 and the power-receiving electrode 21.

(Operation of the Power Supply System)

Figure 3:
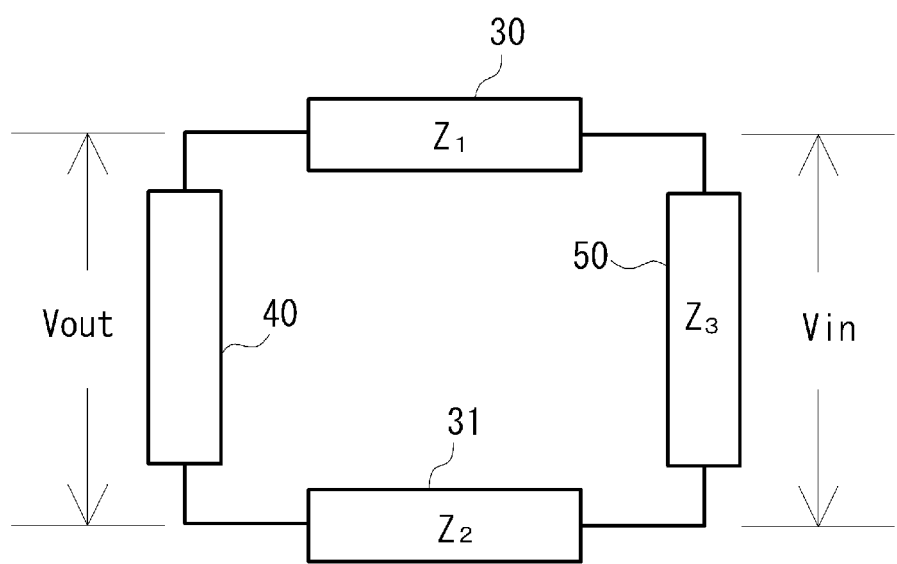
FIG. 3 is a diagram schematically showing a circuit configuration of the power supply system.

Next, the operation of the power supply system configured as described above will be described. FIG. 3 is a diagram schematically showing the circuit configuration of the power supply system. As shown in FIG. 3, the power supply system can be hypothetically divided into a power supply section 40, the first coupling capacitor 30, the second coupling capacitor 31 and a load section 50. This description of the operation assumes that all parts of the fixed body 10 except for the power-transmitting electrodes 12 and 13 correspond to the power supply section 40, and also assumes that all parts of the movable body 10 except for the power-receiving electrodes 21 correspond to the load section 5, and that the load section 50 includes the load 24.

Here, when the impedance $Z_3$ of the load section 50 is set to a value extremely large as compared with those of the impendence $Z_1$ of the first coupling capacitor 30 and the impendence $Z_2$ of the second coupling capacitor 31, voltage drops in the coupling capacitors 30 and 31 can be reduced, and the output voltage $V_{out}$ from the power supply section 40 and the input voltage $V_{in}$ to the load section 50 can be made almost equal to each other. As a result, even when there are changes in capacitances of the coupling capacitors 30 and 31 due to some reason such as changes in relative positions of the power-transmitting electrodes 12 and 13 and the power-transmitting electrodes 21, the influence of such changes on power supply to the load section 50 from the power supply section 40 can be reduced.

Specifically, when the parallel resonance conditions are satisfied with AC power output from the AC power supply 11 at a frequency equal to the parallel resonance frequencies at $f_1$ common to the respective parallel resonance circuits, parallel resonance occurs in the third parallel resonance circuit 22 and fourth parallel resonance circuit 23 of the load section 50. Therefore, because the impedance of a parallel resonance circuit is extremely large under the parallel resonance frequency thereof, the impedance $Z_3$ of the load section 50, which includes the third parallel resonance circuit 22 and fourth parallel resonance circuit 23 where parallel resonance has occurred, can be set to a value extremely large as compared to those of the impedances $Z_1$ and $Z_2$ of the coupling capacitors 30 and 31. As a result, the influence of changes in capacitances of the coupling capacitors 30 and 31 on the power supply can be reduced.

Figure 4:
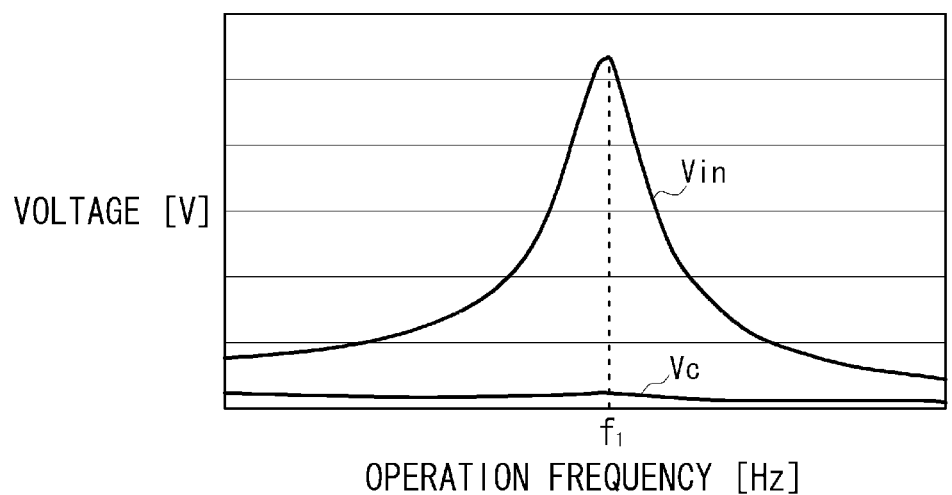
FIG. 4 shows graphs for a case where the capacitance of a coupling capacitor is set to a predetermined standard value $C_1$, and parts (a) and (b) of FIG. 4 are a graph that compares the voltage across the opposite terminals of the coupling capacitor with the input voltage $V_{in}$ to a load section, and a graph that illustrates the power consumption of the load section.
Figure 4:
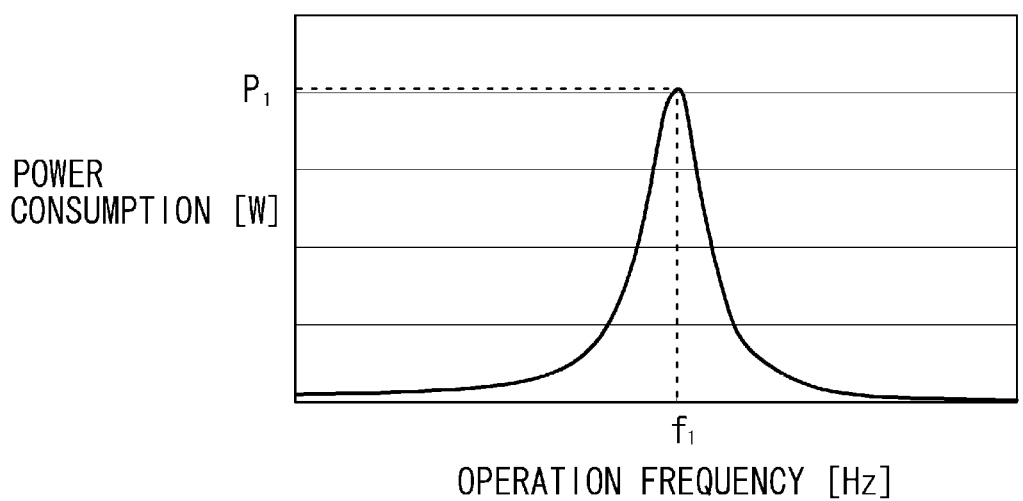
Figure 5:
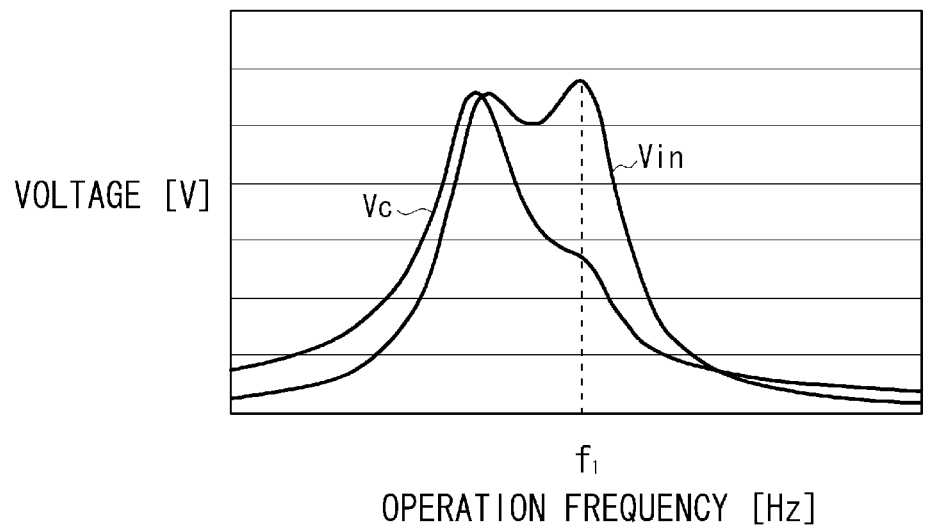
FIG. 5 shows graphs for a case where the capacitance of the coupling capacitor is set to one tenths of $C_1$, and parts (a) and (b) of FIG. 5 are: a graph compares the voltage across the opposite terminals of the coupling capacitor with the input voltage $V_{in}$ to the load section; and a graph that illustrates the power consumption of the load section.
Figure 5:
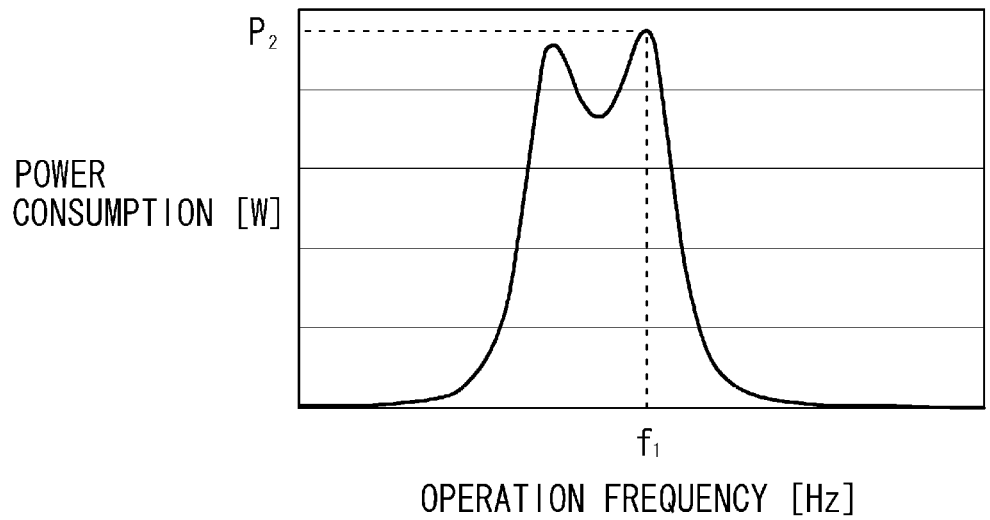

FIGS. 4 and 5 show graphs that compare changes in capacitance of each of the coupling capacitors 30 and 31 with the influence of the changes on power supply in the power supply system shown in FIG. 2. FIG. 4 shows graphs for a case where the capacitances of the coupling capacitors 30 and 31 are set to a predetermined standard value $C_1$, whereas FIG. 5 shows graphs for a case where the capacitances of the coupling capacitors 30 and 31 are set to one tenths of $C_1$. Further, parts (a) of FIGS. 4 and 5 are graphs that compare the voltage $V_C$ across the opposite terminals of each of the coupling capacitors 30 and 31 with the input voltage $V_{in}$ to the load section 50, where the horizontal axis indicates the operation frequency of the power supply system and the vertical axis the voltage. Parts (b) of FIGS. 4 and 5 are graphs each illustrating the power consumption in the load 24, where the horizontal axis indicates the operation frequency of the power supply system and the vertical axis the power consumption.

In the case where the capacitances of the coupling capacitors 30 and 31 are set to $C_1$, the input voltage $V_{in}$ to the load section 50 is extremely large as compared with the voltage $V_C$ across the opposite terminals of each of the coupling capacitors 30 and 31 at the operation frequency equal to the parallel resonance frequency $f_1$, as shown in part (a) of FIG. 4. That is, this is a state where the output voltage $V_{out}$ from the power supply section 40 and the input voltage $V_{in}$ to the load section 50 are almost equal to each other. The power consumption in the load 24 at this point is set to $P_1$ as shown in part (b) of FIG. 4.

On the other hand, in the case where the capacitances of the coupling capacitors 30 and 31 are set to $0.1 \times C_1$, the voltage across the opposite terminals of each of the coupling capacitors 30 and 31 at the operation frequency equal to the parallel resonance frequency $f_1$ shows an increase from the case shown in part (a) of FIG. 4, as shown in part (a) of FIG. 5. As shown in part (b) of FIG. 5, however, the power consumption $P_2$ of the load 24 at this point is higher than the power consumption $P_1$ of the load 24 for the case where the capacitance of the coupling capacitors 30 and 31 are set to $C_1$. That is, it is found that stably power supply is enabled despite the changes in capacitances of the coupling capacitors 30 and 31.

Note that, since increasing the impedance of the load section 50 simply requires parallel resonance to occur in the parallel resonance circuits of the load section 50, the effect of enabling stable power supply despite changes in capacitances of the coupling capacitors 30 and 31 is achievable, with or without the first parallel resonance circuit 14 and second parallel resonance circuit 15, by providing at least any one of the third parallel resonance circuit 22 and fourth parallel resonance circuit 23 to the movable body 20.

Figure 6:
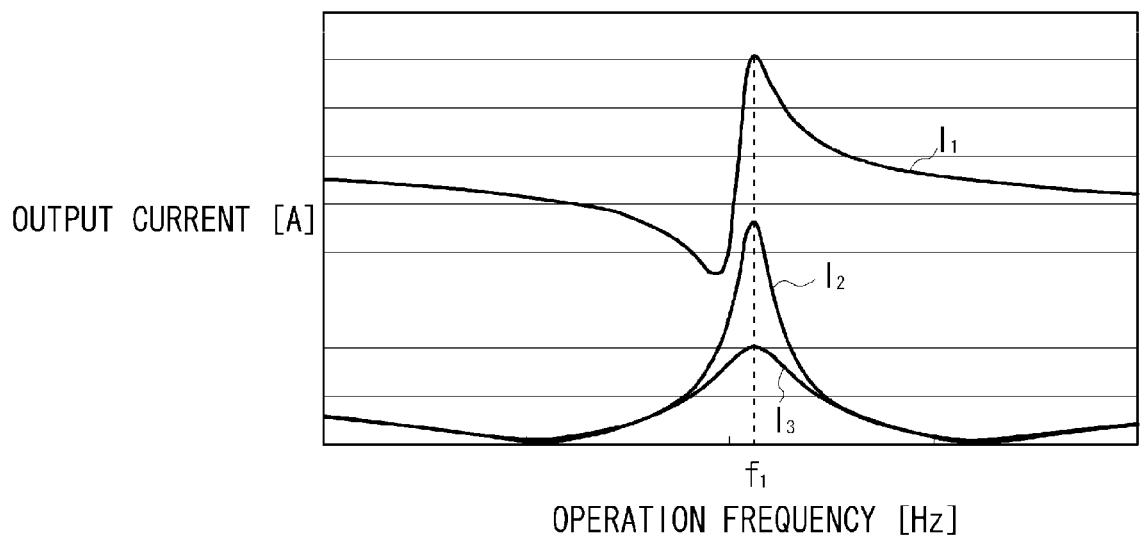
FIG. 6 is a graph illustrating the influence of the presence or absence of parallel resonance circuits in the fixed body and movable body.

FIG. 6 is a graph illustrating the influences of the presence and absence of parallel resonance circuits in the fixed body 10 and movable body 20, where the horizontal axis indicates the operation frequency of the power supply system and the vertical axis the current value. In this graph in FIG. 6, $I_1$ denotes a value of the output current of the AC power supply 11 in a case where the first parallel resonance circuit 14 and fourth parallel resonance circuit 23 are excluded from the power supply system shown in FIG. 2, $I_2$ a value of the output current of the AC power supply 11 in a case where the fourth parallel resonance circuit 23 is excluded from the power supply system shown in FIGS. 2, and $I_3$ a value of the output current of the AC power supply 11 in the power supply system shown in FIG. 2.

AS shown in FIG. 6, from the output current $I_1$ of the AC power supply 11 at a frequency of the parallel resonance frequency $f_1$ in the case to which the first parallel resonance circuit 14 and fourth parallel resonance circuit 23 are not provided, the output current $I_2$ of the AC power supply 11 at the parallel resonance frequency $f_1$ in the case where the first parallel resonance circuit 14 is provided shows a decrease to a value that is 60% of the output current $I_1$ of the AC power supply 11. Further, the output current $I_3$ of the AC power supply 11 in the case where the fourth parallel resonance circuit 23 is provided shows a decrease to a value that is 25% of $I_1$. That is, the amount of reactive current output from the AC power supply 11 is reduced by providing the first parallel resonance circuit 14 and fourth parallel resonance circuit 23.

In this power supply system according to Embodiment 1, unless there is the movable body 20 placed over the fixed body 10, the conditions that cause parallel resonance are not satisfied, and power supply is not allowed. Thus, the safety can be ensured, for example, in such a manner that, even in a case where a person walks on the floor board 3 with the fixed body 10 being always set in the operation mode, an incident of having a current through a human body can be prevented.

(Effects of Embodiment 1)

As described above, the power-transmitting electrodes 12 and 13 are not exposed to the power-consuming region 2 according to Embodiment 1, which makes it possible to eliminate the danger of electric shock occurring when a human body touches the power-transmitting electrodes 12 or 13, and also makes it possible to relieve the psychological anxiety. Therefore, installation of the power supply system in a place to have people inside, such as an office space, is facilitated.

Particularly, the third parallel resonance circuit 22 or fourth parallel resonance circuit 23 is provided to the movable body 20, and power is transmitted to the load 24 under the conditions that cause these parallel resonance in the parallel resonance circuits. This makes it possible to increase the impedance of the load section 50 which includes the parallel resonance circuit and the load 24. This enables reduction of voltage drops in the coupling capacitors 30 and 31, and enables stable power supply regardless of changes in capacitances of the coupling capacitors 30 and 31.

Further, the first parallel resonance circuit 14 or second parallel resonance circuit 15 is provided to the fixed body 10, which makes it possible to reduce the amount of reactive current to be output from the AC power supply 11. This enables the AC power supply 11 to be more compact.

Further, the first parallel resonance circuit 14 and second parallel resonance circuit 15 are provided to the fixed body 10, which makes it possible to reduce the amount of reactive current to be output from the AC power supply 11. This enables the AC power supply 11 to be more compact. Additionally, power is transmitted by the action of mutual induction between the second coil 14b in the first parallel resonance circuit 14 and the third coil 15b in the second parallel resonance circuit 15, which makes it possible to supply power to the load 24 with the output voltage from the AC power supply 11 stepped up.

Further, the third parallel resonance circuit 22 and fourth parallel resonance circuit 23 are provided to the movable body 20, which makes it possible to reduce the amount of reactive current output from the AC power supply 11. This enables the AC power supply 11 to be more compact. Additionally, power is transmitted by the action of mutual induction between the first coil 22b in the third parallel resonance circuit 22 and the fourth coil 23b in the fourth parallel resonance circuit 23, which makes it possible to supply power to the load 24 with the input voltage to the power-receiving electrodes 21 transformed.

{Embodiment 2}

Next, Embodiment 2 will be described, which is an embodiment obtained by further providing plural power-transmitting electrodes to the configuration of Embodiment 1. Note that, since Embodiment 2 is configured substantially identically with Embodiment 1 unless otherwise stated particularly, parts that are configured identically with those of Embodiment 1 are assigned the same reference numerals and/or names as those of Embodiment 1 as necessary, and the description thereof will not be repeated.

(Configuration—the Fixed Body)

Figure 7:
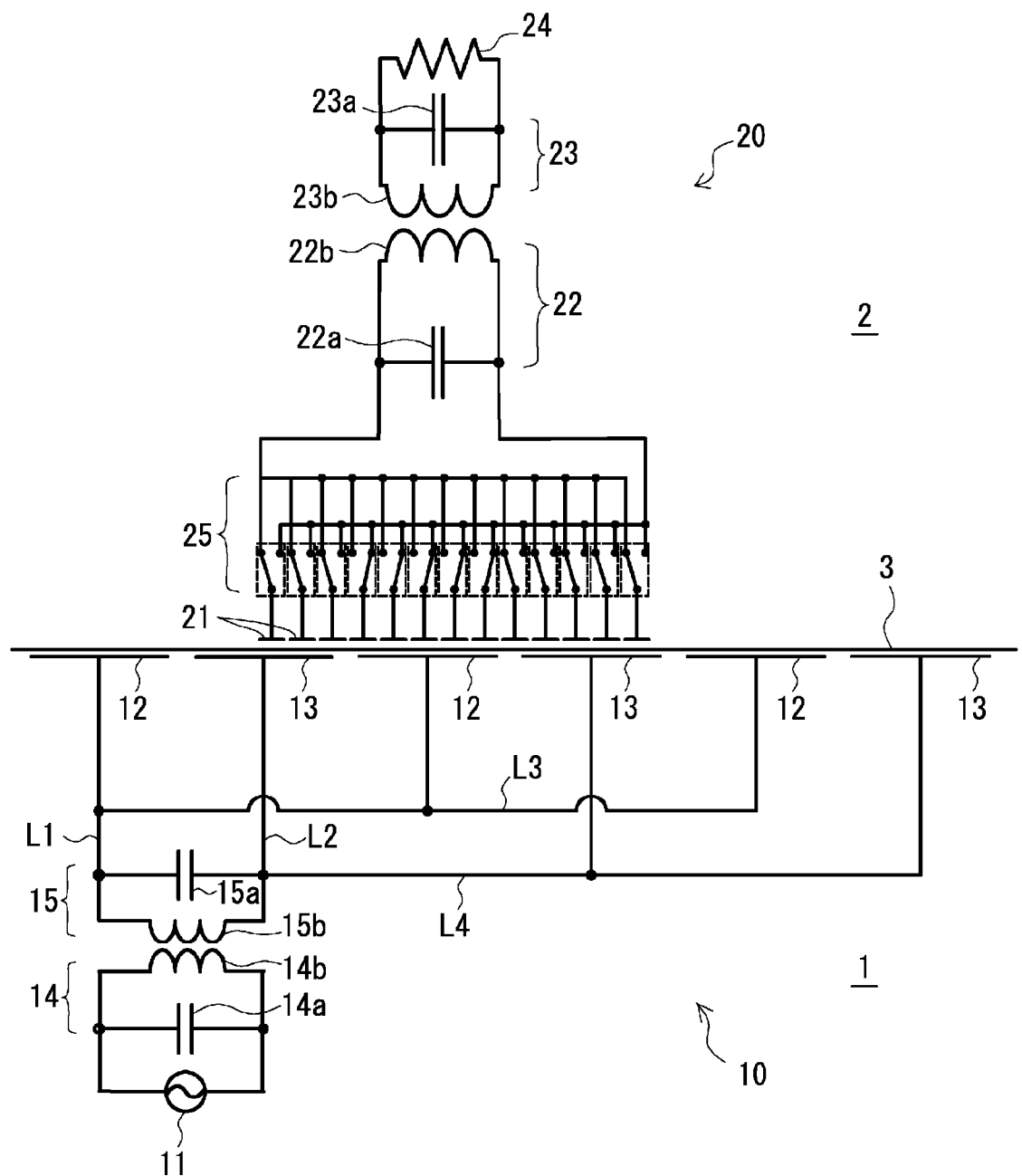
FIG. 7 is a vertical cross-sectional view schematically showing a fixed body and movable body according to Embodiment 2.
Figure 8:
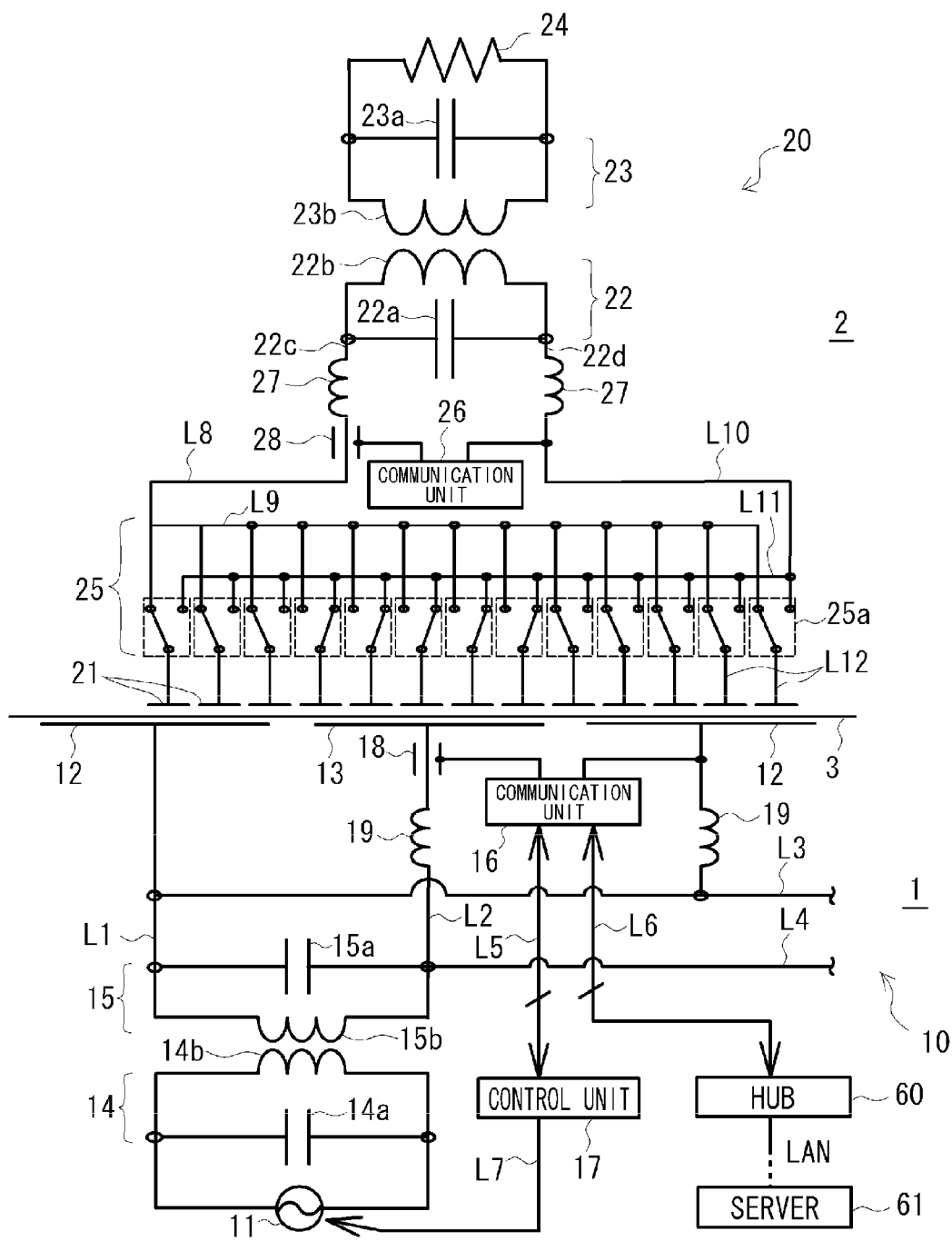
FIG. 8 is an enlarged view of the essential parts of the fixed body and movable body shown in FIG. 7.

FIG. 7 is a vertical cross-sectional view schematically showing the fixed body 10 and movable body 20 according to Embodiment 2. FIG. 8 is an enlarged view of essential parts, which shows the fixed body 10 and fixed body 20 in FIG. 7 in detail. While having the configuration of the fixed body 10 as in Embodiment 1, the fixed body 10 additionally includes the multiple power-transmitting electrodes 12 and 13, and also includes a communication unit 16 and a control unit 17 (controller).

As shown in FIGS. 7 and 8, in order to enhance efficiency in laying out the power-transmitting electrodes 12 and 13 per unit area, the power-transmitting electrodes 12 and 13 are provided side by side with a predetermined distance apart from each other, and are alternately arranged so that each two adjacent ones thereof may be different in polarity.

Note that, in the example in the FIGS. 7 and 8, the single second parallel resonance circuit 15 is connected to the first power-transmitting electrode 12 via a line L1 while being connected to the second power-transmitting electrode 13 via a line L2. Lines L3 and L4 are connected to these lines L1 and L2, respectively, so that power is supplied to the plural first power-transmitting electrodes 12 and plural second power-transmitting electrodes 13, via these lines L3 and L4, from the common AC power supply 11 via the common first parallel resonance circuit 14 and second parallel resonance circuit 15. Although FIGS. 9 and 10 omit to show a configuration for supplying power to the communication unit 16 and the control unit 17, the power may be supplied from the AC power supply 11, or via an arbitrary route from another power supply not shown that is different from the AC power supply 11, to the communication unit 16 or the control unit 17.

In FIG. 8, the communication unit 16 is communication means to communicate with a communication unit 26 to be described later, the communication unit 26 being provided to the movable body 20. Although the specific configuration of the communication unit 16 is arbitrary, the communication unit 16 is configured by using the RF/MAC scheme by which RF communication is performed under the MAC protocol (the same applies to the communication unit 26 to be described later). This communication unit 16 acquires, via a capacitor 18 for the coupling purpose, communication signals from the movable body 20 that have been superimposed onto power transmission routes and output via the lines L1 and L2. Note that communication signals output via the lines L1 and L2 are blocked by coils 19 provided for blocking communication signals, the coils 19 being connected to the lines L1 and L2. This communication unit 16 is connected to the control unit 17 via a line L5 so as to be able to communicate with each other. Additionally, this communication unit 16 is connected to a hub 60 via a line L6, and this hub 60 is further connected to a server 61.

This control unit 17 is control means to control the fixed body 10, and, for example, is connected to the server 61 via the hub 60 and configured to perform control operations in accordance with a control signal output from this server 61. However, the hub 60 and server 61 may be omitted by embedding a self-contained control program into the control unit 17 to enable the control unit 17 to perform the control in a self-contained manner. Further, a communication destination other than the server 61 may be connected to the control unit 17. For example, the control unit 17 may be configured to communicate with the control unit 17 of the other ones of the fixed bodies 10 to enable gang control over the plural fixed bodies 10 placed in the power-supplying region 1. On the other hand, this control unit 17 is connected to the AC power supply 11 via a line L7, and controls power supply to the fixed body 10 by turning on and off the AC power supply 11 and controlling the frequency thereof. Although the specific configuration of this control unit 17 is arbitrary, the control unit 17 is configured to contain, for example, a CPU (Central Processing Unit) and a program that is interpreted and executed by this CPU.

(Configuration—the Movable Body)

While having the configuration of the movable body 20 as in Embodiment 1, the movable body 20 additionally includes the multiple power-receiving electrodes 21, and also includes a determination/switching section 25 and the communication unit 26.

It is needed only to provide at least one set of the power-receiving electrodes 21 to a single one of the movable bodies 20. In this case, however, the multiple power-receiving electrodes 21 are arranged corresponding to a single one of the movable bodies 20 as shown in FIGS. 7 and 8, whereby a predetermined size of the gross area for receiving power is secured. The aggregate of the power-receiving electrodes 21 provided side by side in the case where the multiple power-receiving electrodes 21 are thus arranged in a single one of the movable bodies 20 takes an arbitrary shape, and may take, for example, a rectangular shape or a round shape. Each of the power-receiving electrodes 21 may also take a rectangular shape or a round shape as the shape thereof viewed from the flat side.

Further, in FIGS. 7 and 8, the width of each of the power-receiving electrodes 21 is determined so as to be sufficiently smaller than a distance between each adjacent two of the plural power-receiving electrodes 12 and 13 provided side by side. Therefore, any one of the power-receiving electrodes 21 never overlaps any adjacent two of the power-transmitting electrodes 12 and 13 at the same time. This makes it possible to prevent any one of the power-receiving electrodes 21 from forming capacitors with plural ones of the power-transmitting electrodes 12 and 13, and therefore prevent such capacitors from adversely affecting power supply. This configuration allows the power-receiving electrodes 21 to be placed at arbitrary positions, thereby making it possible to increase the degree of freedom for movement of the movable body 20.

Further, it is preferable that a distance between each adjacent two of the power-receiving electrodes 21 be determined in such a manner that capacitor capacities between adjacent ones of the plural power-receiving electrodes 21 may not adversely affect power supply. Specifically, the distance between each adjacent two of the power-receiving electrodes 21 is determined so as to prevent currents from flowing, via capacitors, from one of the first power-transmitting electrodes 12 and the second power-transmitting electrodes 13, to other one of the first power-transmitting electrodes 12 and the second power-transmitting electrodes 13.

The determination/switching section 25 is determination/switching means to determine whether an electrode placed in a manner opposed to each of the multiple power-receiving electrodes 21 is the first power-transmitting electrode 12 or the second power-transmitting electrode 13, and then change, based on the result of this determination, the connection states of the respective plural power-receiving electrodes 21 to the load 24. The determination/switching section 25 corresponds to connection means in the claims. When the determination/switching section 25 changes the connection states, those of the multiple power-receiving electrodes 21 that are placed in a manner opposed to some of the power-transmitting electrodes, each of which is any one of the first power-transmitting electrode 12 and second power-transmitting electrodes 13, are enabled to function as the first power-receiving electrodes 21a and receive power, whereas those that are placed in a manner opposed to some others of the power-transmitting electrodes, each of which is the other one thereof, are enabled to function as the second power-receiving electrodes 21a and receive power.

Although the specific configuration of this determination/switching section 25 is arbitrary, the determination/switching section 25 is configured, for example, by including: a line L9 branching off from a line L8 connected to one terminal 22c (hereinafter, first terminal) of the third parallel resonance circuit 22 via one of coils 27; a line L11 branching off from a line L10 connected to the other terminal 22b (hereinafter, second terminal) of the third parallel resonance circuit 22 via the other one of the coils 27; lines 12 connected to the respective power-receiving electrodes 21; and a plurality of switching switches 25a to connect each of these lines L12 selectively to any one of the line L9 and line L11.

A specific configuration for causing the switching switch 25a to operate based on whether an electrode placed in a manner opposed to each of the plural power-receiving electrodes 21 is the first power-transmitting electrode 12 or the second power-transmitting electrode 13 is arbitrary. For example, the first power-transmitting electrodes 12 or the second power-transmitting electrodes 13 are formed of a ferromagnetic electric conductor (for example, iron, cobalt, nickel or the like), and the other power-transmitting electrodes are formed of a nonmagnetic electric conductor (for example, aluminum, austenitic stainless steels or the like). On the other hand, permanent magnets are provided to the traveling contacts of the switching switches 25a. This configuration enables the magnitudes of magnetic forces to differ according to whether an electrode placed in a manner opposed to each of the power-receiving electrodes 21 is the first power-transmitting electrode 12 or the second power-transmitting electrode 13, the magnetic forces acting on the respective travelling contacts. Therefore, it is made possible to operate the travelling contacts based on the difference, and connect each of the lines L12 selectively to any one of the line L9 and line L11.

The communication unit 26 is communication means to communicate with the communication unit 16 of the fixed body 10. This communication unit 16 outputs communication signals to the lines L8 and L10 via a capacitor 28 used for the coupling purpose while superimposing the communication signals onto these lines. Note that, while this power supply system uses power having a frequency of around 1 MHz in power supply, a frequency band around several GHz is supposed to be used for communication using the communication units 16 and 26. It is considered that no transmission loss is caused since the capacitances of the coupling capacitors 30 and 31 and capacitors 18 and 28 are sufficiently large for communication frequencies.

(Power Supply Control Process)

Next, a power supply control process in the fixed body 10 and movable body 20 configured as described above will be described with reference to FIG. 8. In this control, either of two modes is selected in supplying power, the two modes being: a standby mode where the power consumption of the fixed body 10 is reduced with some of the functions of the fixed body 10 being set on standby; and a normal operation mode where power is supplied with all of the functions of the fixed body 10 being set ready for operation.

For example, the movable body 20 is placed at an arbitrary position on the floor board 3 at an arbitrary point in time. Meanwhile, the communication unit 26 constantly outputs a power supply request signal.

On the other hand, the fixed body 10 is set on standby mode in the initial state. Specifically, power saving is achieved by activating only the communication unit 16 with a minute amount of power supplied only to the communication unit 16 and, at the same time, putting the other parts in a sleep state with no power supplied thereto. The communication unit 16 of the fixed body 10 continuously monitors the power supply request signal output from the communication unit 26 of the movable body 20. Therefore, when the movable body 20 is placed over the fixed body 10, the communication unit 16 receives the power supply request signal output from the communication unit 26. When the power supply request signal thus received is transmitted from the communication unit 16 to the control unit 17, the mode is changed from the standby mode to the operation mode, whereby the control unit 17 is activated to start power supply control. Such power supply control makes it possible to reduce the power consumption of the fixed body 10 as compared to a case where the fixed body 10 is always set in the operation mode.

Note that, in addition to the above described process, authentication using IDs may be performed on the movable body 20. For example, the ID of the movable body 20 is transmitted along with the power supply request signal from the communication unit 26 to the communication unit 16. Then, the communication unit 16, upon receiving this ID, transmits the ID to the control unit 17. The control unit 17 further transmits this ID to the server 61 via the hub 60. This server 61 performs authentication based on previously registered IDs, and then returns the result of the authentication to the control unit 17. Then, based on this result of the authentication, the control unit 17 may determine whether or not to permit power to be supplied.

(Effects of Embodiment 2)

According to Embodiment 2, the plural power-transmitting electrodes 12 and 13 are provided side by side, and the connection state of each of the power-receiving electrodes 21 to the load 24 is automatically changed by use of the determination/switching section 25 on the basis of which of the power-transmitting electrodes 12 or 13 opposed to the power-receiving electrode 21. Therefore, power supply to the movable body 20 is enabled regardless of whatever arbitrary position the movable body 20 is placed with respect to the fixed body 10.

{Embodiment 3}

Next, Embodiment 3 will be described. This embodiment is an embodiment not only having the configuration of Embodiment 2 but also including the second capacitor and second coil provided to each set of the first power-transmitting electrode and second power-transmitting electrode. In this embodiment, conditions that cause parallel resonance in the respective sets of the second capacitors and the third coils are made different from one another. Note that, since Embodiment 3 is configured substantially identically with Embodiment 2 unless otherwise stated particularly, parts that are configured substantially identically with those of Embodiment 2 are assigned the same reference numerals and/or names as those of Embodiment 2 as necessary, and the description thereof will not be repeated.

(Configuration—the Fixed Body)

Figure 9:
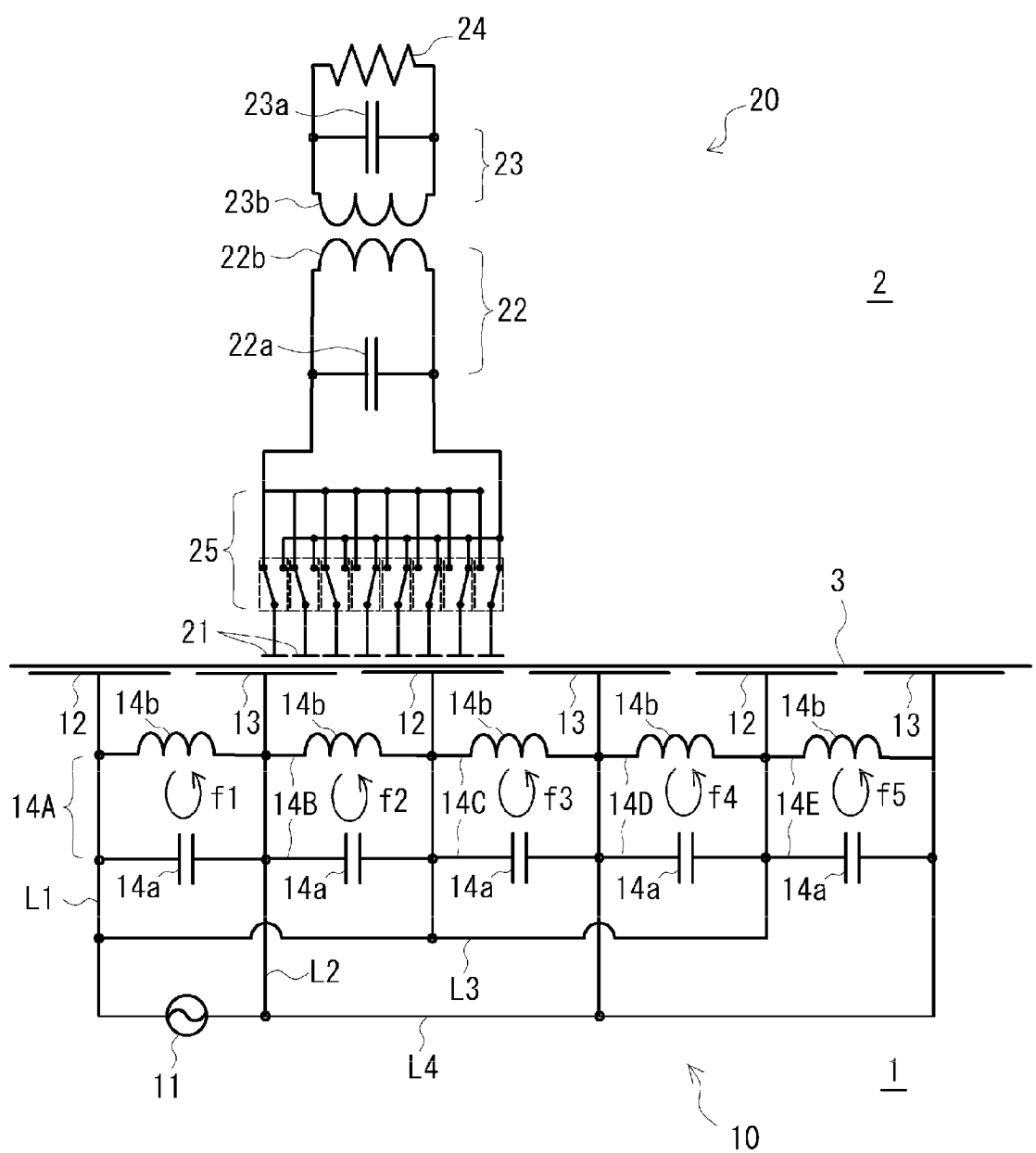
FIG. 9 is a vertical cross-sectional view schematically showing a fixed body and movable body according to Embodiment 3.
Figure 10:
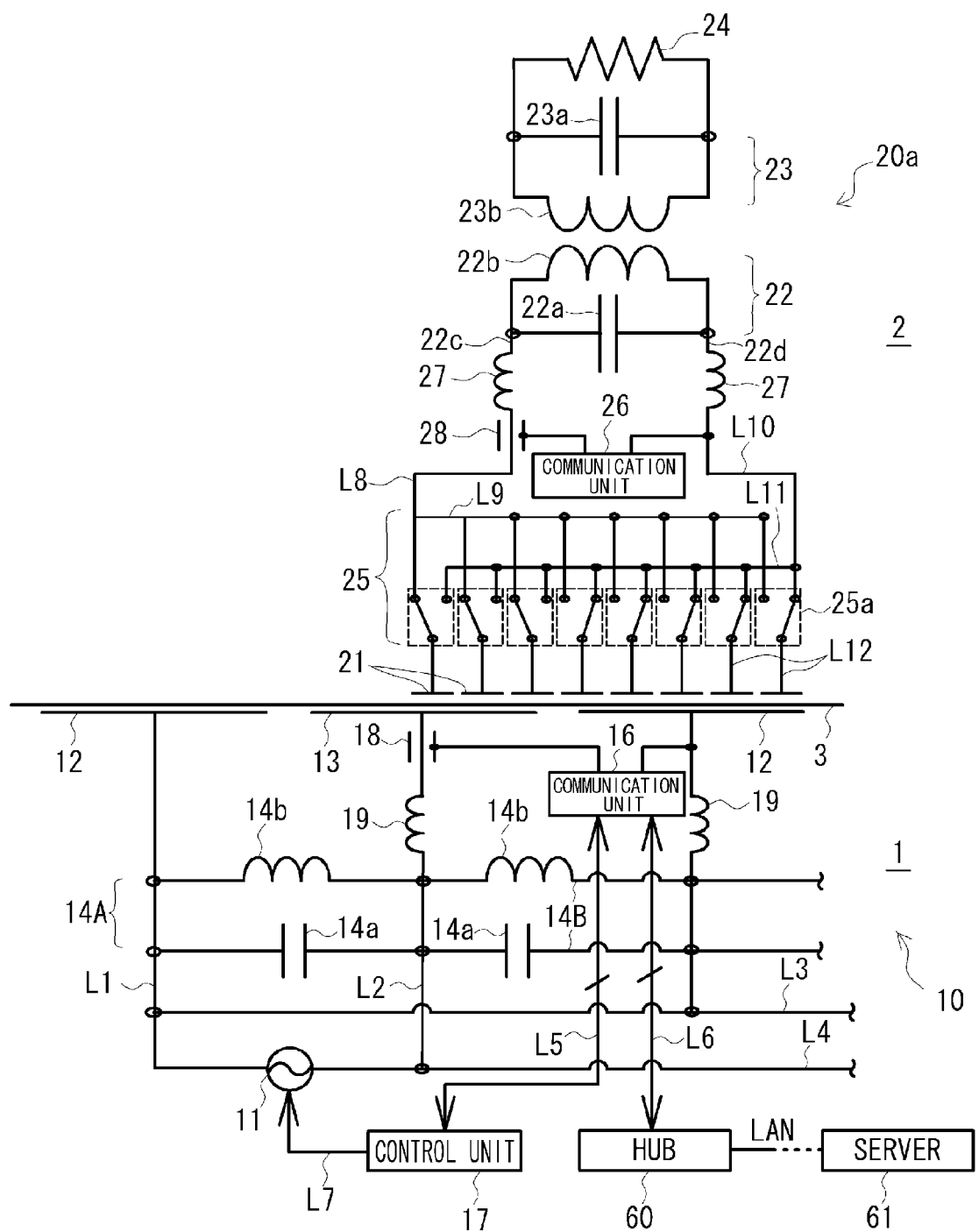
FIG. 10 is an enlarged view of the essential parts of the fixed body and movable body shown in FIG. 9.
Figure 11:
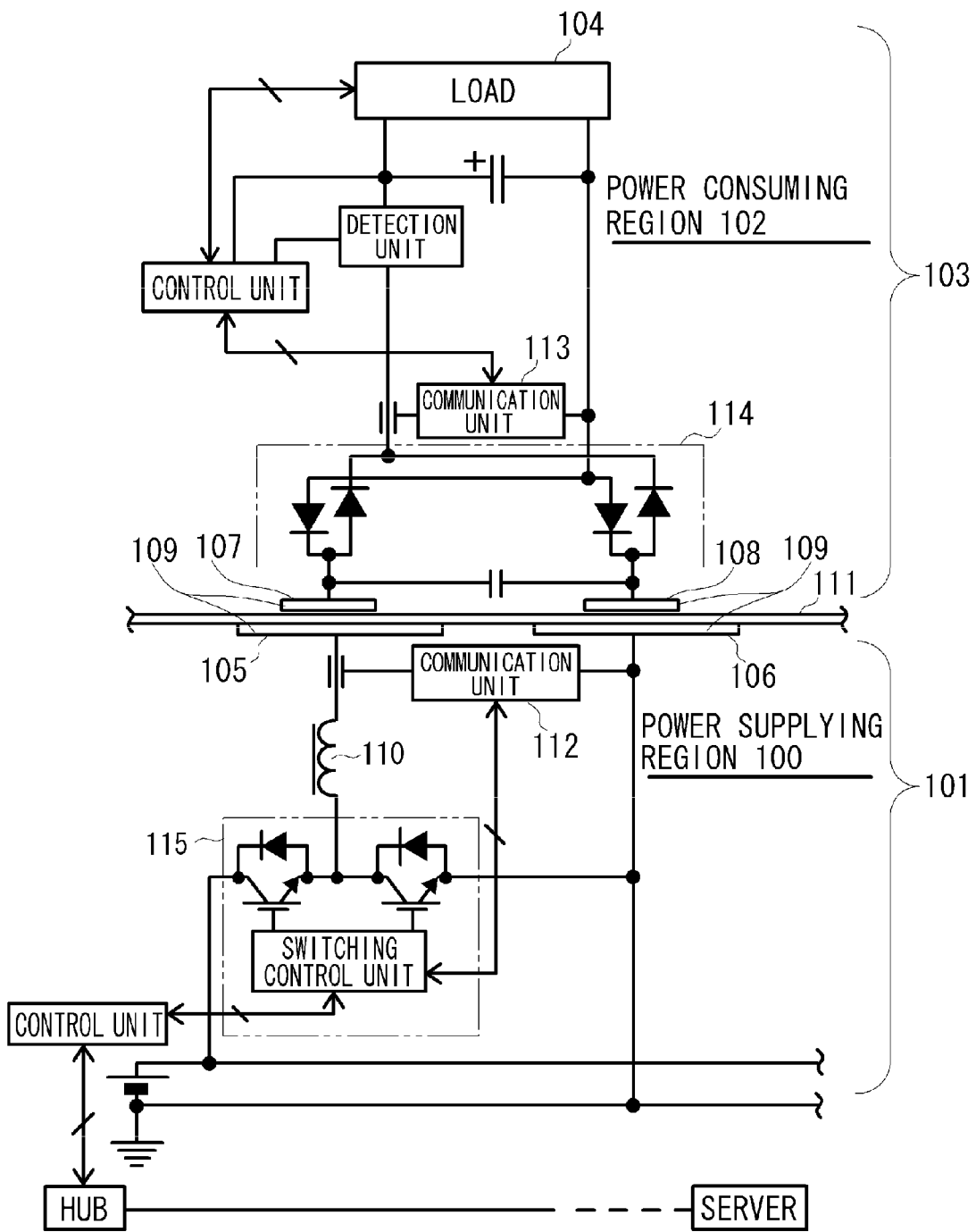
FIG. 11 is a vertical cross-sectional view of the essential part of a conventional power supply system.

FIG. 9 is a vertical cross-sectional view schematically showing the fixed body 10 and movable body 20 according to Embodiment 3. FIG. 10 is an enlarged view of essential parts, which shows the fixed body 10 and movable body 20 in FIG. 9 in detail. While having the configuration of the fixed body 10 as in Embodiment 2, the fixed body 10 further includes the first parallel resonance circuit 14 provided to each set of the first power-transmitting electrode 12 and second power-transmitting electrode 13. Note that, in the example shown in FIGS. 9 and 10, while the second parallel resonance circuits 15 are excluded, each set of the first power-transmitting electrode 12 and second power-transmitting electrode 13 and the first parallel resonance circuit 14 are connected directly to each other. However, by providing the second parallel resonance circuits 15 each between one set of the power-transmitting electrodes 12 and 13 and the corresponding first parallel resonance circuit 14, power transmission may be enabled under the action of mutual induction between the third coil 15b of each of the second parallel resonance circuits 15 and the second coil 14b of the corresponding first parallel resonance circuit 14.

In the first parallel resonance circuits 14 thus provided to the respective sets of the power-transmitting electrodes 12 and 13, the capacitances of the second capacitors 14a and the inductances of the second coils 14b are set so that parallel resonance may be caused under different parallel resonance frequencies. In the example shown in FIGS. 9 and 10, the capacitances of the second capacitors 14a and the inductances of the second coils 14b in the respective parallel resonance circuits are set so that the parallel resonance frequencies of the first parallel resonance circuit 14A, first parallel resonance circuit 14B, first parallel resonance circuit 14C, first parallel resonance circuit 14D and first parallel resonance circuit 14E may be f1, f2, f3, f4 and f5, respectively.

The control unit 17 controls the frequency of the AC power supply 11 in order that parallel resonance can occur in an arbitrary one of the first parallel resonance circuits 14 and that power can be supplied to the power-transmitting electrodes 12 and 13 to which this first parallel resonance circuits 14 is provided. For example, while an actuator is provided in the neighborhood of the power-receiving electrodes 21 of the movable body 20, an energy sensor is provided to the power-transmitting electrodes 12 and 13, the actuator being configured to function as energy outputting means to generate energy in the form of electric waves, magnetic fields, sonic waves, vibrations, light or the like, the energy sensor being configured to function as energy detection means to detect this energy (the actuator and energy sensor are not shown in the drawings). An output signal coming out from the energy sensor upon detecting the energy output from the actuator is transmitted to the server 61 via the control unit 17 and hub 60.

Based on a previously registered database, the server 61 identifies a set of the power-transmitting electrodes 12 and 13 to which the sensor that has detected the energy is provided, then identifies the parallel resonance frequency of the first parallel resonance circuit 14 provided to this set of the identified power-transmitting electrodes 12 and 13, and then returns the value of the thus identified frequency to the control unit 17. The control unit 17 causes power to be output from the AC power supply 11 at a frequency of this value. This makes it possible to cause parallel resonance only in the first parallel resonance circuit 14 provided to a set of the power-transmitting electrodes 12 and 13 to which the power-receiving electrodes 21 have approached, whereby power is supplied via this first parallel resonance circuit 14 to these power-transmitting electrodes 12 and 13 to which the power-receiving electrodes 21 have approached.

(Configuration—the Movable Body)

In Embodiment 3, the movable bodies 20 of two types may be used, which are: a fixed-frequency type movable body 20a configured to have fixed values for the parallel resonance frequencies of the third parallel resonance circuit 22 and fourth parallel resonance circuit 23; and a variable-frequency type movable body 20b (not shown) configured so that the parallel resonance frequencies of the third parallel resonance circuit 22 and fourth parallel resonance circuit 23 may be variable.

(Configuration—the Fixed-Frequency Type Movable Body)

The fixed-frequency type movable body 20a is configured identically with the movable body 20 of Embodiment 2. In this case, the capacitances of the first capacitor 22a and fourth capacitor 23a, and the inductances of the first coil 22b and fourth coil 23b are set so that the parallel resonance frequencies of the third parallel resonance circuit 22 and fourth parallel resonance circuit 23 of the fixed-frequency type movable body 20a may be equal to any one of the parallel resonance frequencies of the first parallel resonance circuits 14 in the fixed body 10 (any one of f1, f2, f3, f4 and f5 in FIGS. 9 and 10).

When this fixed-frequency type movable body 20a is used, it is necessary to oppose the power receiving electrodes 21 to the power-transmitting electrodes 12 and 13 to which the first parallel resonance circuit 14 that has the parallel resonance frequency equal to the parallel resonance frequencies of the third parallel resonance circuit 22 and fourth parallel resonance circuit 23 of the fixed-frequency type movable body 20a is provided. Therefore, it is necessary to inform a user of a position at which the fixed-frequency type movable body 20a should be placed.

How to inform the user thereof is arbitrary. For example, the following manner may be employed. The floor board 3 is painted with colors previously determined to correspond to the values of the respective parallel resonance frequencies of the first parallel resonance circuits 14 included in the respective sets of the power-transmitting electrodes 12 and 13 arranged directly under the floor board 3. At the same time, a part of the fixed-frequency type movable body 20a is painted with a color previously determined to correspond to the value of the parallel resonance frequencies of the third parallel resonance circuit 22 and fourth parallel resonance circuit 23 of the fixed-frequency type movable body 20a. In this case, power supply from the power-transmitting electrodes 12 and 13 to the fixed-frequency type movable body 20a is enabled when the fixed-frequency type movable body 20a is set on the floor board 3 that has been painted with the same color as the color with which the fixed-frequency type movable body 20a has been painted.

Otherwise, the position at which the fixed-frequency type movable body 20a should be placed may be indicated by providing pilot lamps on the surface of the floor board 3 in the neighborhoods of the respective sets of the power-transmitting electrodes 12 and 13, and turning on the pilot lamp corresponding to a set of the power-transmitting electrodes 12 and 13 that is capable of supplying power to the fixed-frequency type movable body 20a, the pilot lamps using LEDs or the like. In this case, information by which to identify a value of the parallel resonance frequencies of the third parallel resonance circuit 22 and fourth parallel resonance circuit 23 of the fixed-frequency type movable body 20a to be used is input to the server 61 via input means that is heretofore known. The server 61 identifies a set of the first power-transmitting electrodes 12 and 13 that has the first parallel resonance circuit 14 in which parallel resonance occurs at the parallel resonance frequency of the same value based on the input information and the database set in advance. Then, the server 61 transmits to the control unit 17 via the hub 60 and the communication unit 17 a light signal of the pilot lamp provided in the neighborhood of the thus identified set of the first power-transmitting electrodes 12 and 13, so that the pilot lamp is turned on.

(Configuration—the Variable-Frequency Type Movable Body)

In the variable-frequency type movable body 20b (not shown), in order to make the parallel resonance frequencies of the third parallel resonance circuit 22 and fourth parallel resonance circuit 23 variable, the first coil 22b and fourth coil 23b are configured as variable inductors or the first capacitor 22a and fourth capacitor 23a are configured as variable capacitors. At the same time, the variable-frequency type movable body 20b (not shown) includes a control unit 29 (not shown) to control these variable inductors or variable capacitors.

When this variable-frequency type movable body 20b is used, it is necessary that the parallel resonance frequencies of the third parallel resonance circuit 22 and fourth parallel resonance circuit 23 of the variable-frequency type movable body 20b be made equal to the parallel resonance frequency of the first parallel resonance circuit 14 provided to the power-transmitting electrodes 12 and 13 that are opposed to the power receiving electrodes 21 of the variable-frequency type movable body 20a placed on the floor board 3.

How to make the parallel resonance frequencies of the third parallel resonance circuit 22 and fourth parallel resonance circuit 23 in the variable-frequency type movable body 20b equal to the parallel resonance frequency of the first parallel resonance circuit 14 provided to the power-transmitting electrodes 12 and 13 is arbitrary. For example, as described above, the control unit 17 receives from the server 61 via the communication unit 16 the value of the parallel resonance frequency of the first parallel resonance circuit 14 provided to the power-transmitting electrodes 12 and 13 to which the power-receiving electrodes 12 have approached. Further, upon receiving via the communication unit 16 the power supply request signal transmitted from the communication unit 26 of the variable-frequency type movable body 20b, the control unit 17 of the fixed body 10 transmits to the variable-frequency type movable body 20a via the communication unit 16 the value of the parallel resonance frequency of the first parallel resonance circuit 14 received from the server 61. The control unit 29 of the variable-frequency type movable body 20b, upon receiving the value of the parallel resonance frequency of the first parallel resonance circuit 14 via the communication unit 26, adjusts the inductances of the first coil 22b and fourth coil 23b or the capacitances of the first capacitor 22a and fourth capacitor 23a so that the parallel resonance frequencies of the third parallel resonance circuit 22 and fourth parallel resonance circuit 23 may be made equal to the thus received parallel resonance frequency value.

Otherwise, the control unit 17 of the fixed body 10 is configured to perform power supply control so that a constant level of power may be constantly supplied from the AC power supply 11 to the power-transmitting electrodes 12 and 13. On the other hand, the control unit 29 of the variable-frequency type movable body 20b is configured to constantly change the inductances of the first coil 22b and fourth coil 23b or the capacitances of the first capacitor 22a and fourth capacitor 23a, so that the parallel resonance frequencies of the third parallel resonance circuit 22 and fourth parallel resonance circuit 23 are constantly changed. Here, the control unit 29 may be configured to perform control in the following manner. When power supply from the power-transmitting electrodes 12 and 13 to the power receiving electrodes 21 is enabled as the parallel resonance frequencies of the third parallel resonance circuit 22 and fourth parallel resonance circuit 23 have been made equal to the parallel resonance frequency of the first parallel resonance circuit 14 of the fixed body 10, the parallel resonance frequencies of the third parallel resonance circuit 22 and fourth parallel resonance circuit 23 are fixed, so that power is supplied without interruption from the power-transmitting electrodes 12 and 13.

(Effects of Embodiment 3)

According to Embodiment 3, the first parallel resonance circuits 14 are provided to the respective sets of the plural power-transmitting electrodes 12 and 13. This enables reduction of the amount of reactive current to be output from the AC power supply 11, and therefore enables the AC power supply 11 to be more compact.

The different first parallel resonance circuits 14 of each set of the plural power-transmitting electrodes 12 and 13 are configured to have parallel resonance frequencies of different values. This makes it possible to, only by changing the output frequency of the AC power supply 11, cause resonance only in an arbitrary one of the first parallel resonance circuits 14 and supply power only to the power-transmitting electrodes 12 and 13 which have this first parallel resonance circuits 14. This makes it unnecessary that any circuit, such as a switch, for switching between the sets of the power-transmitting electrodes 12 and 13 for supplying power be provided to the fixed body 10. As a result, the reliability can be improved.

{III} Variations Based on the Embodiments

Although the respective embodiments according to the present invention have been described above, the specific configurations and means of the present invention can be arbitrarily modified and improved without departing from the technical concepts of the invention defined in the appended claims. Variations obtained through such modification and improvement will be described below.

(Regarding Problems to be Solved and Effects of the Invention)

First of all, problems to be solved by the invention and effects of the invention are not limited to those described above, and can differ according to the environment where the invention is carried out and according to the details of configurations. In some cases, only some of the above described problems are solved, and some of the above described effects are brought about. In other cases, a problem that is not described above is solved, or an effect that is not described above is brought about, by the present invention.

(Regarding Switching of the First Parallel Resonance Circuits in which to Cause Parallel Resonance)

Embodiment 3 described above explains that: the different first parallel resonance circuits 14 provided to the respective sets of the power-transmitting electrodes 12 and 13 are configured to have parallel resonance frequencies of different values, and the frequency of the AC power supply 11 is controlled, whereby parallel resonance is caused in an arbitrary one of the first parallel resonance circuits 14. However, the first parallel resonance circuits 14 for causing parallel resonance may be switched in another manner. For example, parallel resonance may be caused only in one, in which parallel resonance should be caused, of the first parallel resonance circuits 14 in such a manner that: a switch is provided to each of the first parallel resonance circuits 14 provided to the respective sets of the power-transmitting electrodes 12 and 13, and the AC power supply 11; and only the switch that is provided between the one of the first parallel resonance circuits 14 and the AC power supply 11 is turned on.

(Regarding the AC Power Supply)

In Embodiment 3 described above, the explanation has been given by citing the case where the fixed bodies 10 are provided with the only one AC power supply 11 in common. However, Embodiment 3 may be configured so as to include the plural AC power supplies 11. For example, the AC power supplies 11 that are capable of outputting AC power at frequencies equal to values of the parallel resonance frequencies of the first parallel resonance circuits 14 may be connected to the corresponding sets of the power-transmitting electrodes 12 and 13, the values being different among the sets of the power-transmitting electrodes 12 and 13. In this case, parallel resonance can be concurrently caused in the plural first parallel resonance circuits 14 by causing the AC power supplies 11 to output AC power at the frequencies of different values. Therefore, for example, even in a case where the power-receiving electrodes of the movable body 20 are placed in a manner opposed to plural sets of the power-transmitting electrodes 12 and 13, this makes it possible to supply power to the power-receiving electrodes 21 from these plural sets of the power-transmitting electrodes 12 and 13.

INDUSTRIAL APPLICABILITY

The present invention is configured to supply power to spaces of various types, and is particularly beneficial in stably supplying power regardless of changes in placement of electrodes while ensuring the safety of users.

DESCRIPTION OF REFERENCE NUMERALS 1, 100 power supplying region
2, 102 power receiving region
3, 111 floor board
10, 101 fixed body
11, 115 AC power supply
12, 105 first power-transmitting electrode
13, 106 second power-transmitting electrode
14 first parallel resonance circuit
14a second capacitor
14b second coil
15 second parallel resonance circuit
15a third capacitor
15b third coil
16, 26, 112, 113 communication unit
17, 29 control unit
18, 28 capacitor
19, 27, 110 coil
20, 103 movable body
20a fixed-frequency type movable body
20b variable-frequency type movable body
21 power receiving electrode
21a, 107 first power receiving electrode
21b, 108 second power receiving electrode
22 third parallel resonance circuit
22a first capacitor
22b first coil
22c, 22d terminal
23 fourth parallel resonance circuit
23a fourth capacitor
23b fourth coil
24, 104 load
25 determination/switching section
25a switching switch
30 first coupling capacitor
31 second coupling capacitor
40 power supply section
50 load section
60 hub
61 server
109 coupling capacitor
114 connection section

The invention claimed is:

1. A power supply system for supplying power from a fixed body placed in a power-supplying region, via a movable body placed in a power-consuming region, to a predetermined load, wherein the fixed body comprises:
   a first power-transmitting electrode and second power-transmitting electrode to which AC power is supplied and are configured to be placed at a position in the neighborhood of the interface between the power-supplying region and power-consuming region; and
   an AC power supply to supply power to the first power-transmitting electrode and second power-transmitting electrode,
   wherein the movable body comprises:
   a first power-receiving electrode and second power-receiving electrode to be placed in a manner opposed to and not contacting the first power-transmitting electrode and second power-transmitting electrode with the interface interposed therebetween;
   a first capacitor and first coil connected to each other in parallel between the first power-receiving electrode and second power-receiving electrode,
   wherein, while a first coupling capacitor is formed when one of the first power-receiving electrode and second power-receiving electrode is placed in a manner opposed to the first power-transmitting electrode, a second coupling capacitor is formed when the other one of the first power-receiving electrode and second power-receiving electrode is placed in a manner opposed to the second power-transmitting electrode,
   wherein the AC power supply transmits power to the load via the first and second coupling capacitors under a condition that causes parallel resonance between the first capacitor and first coil.

2. The power supply system of claim 1, wherein:
   the fixed body further comprises a second capacitor and second coil connected to each other in parallel between the first power-transmitting electrode and second power-transmitting electrode; and
   the AC power supply supplies power to the load under a condition that causes parallel resonance between the second capacitor and second coil.

3. The power supply system of claim 2, wherein:
the fixed body further comprises a third capacitor and third coil connected to each other in parallel in such a manner that the third capacitor and third coil are laid parallel to the first and second power-transmitting electrodes and to the second capacitor and second coil;
the second and third coils are arranged in a manner that enables transformation of the voltages thereof due to mutual induction; and
the AC power supply supplies power to the load via the third coil under a condition that causes parallel resonance between the third capacitor and third coil.

4. The power supply system of claim 2, wherein conditions that cause parallel resonance in the respective sets of the second capacitors and second coils are made different from one another.

5. The power supply system of claim 1, wherein:
the multiple first power-transmitting electrodes and the multiple second power-transmitting electrodes are provided to the fixed body along the foregoing interface in parallel;
connection means, which electrically connects the first power-receiving electrode and the second power-receiving electrode to the load, is provided to the movable body, the connection means being configured to enable electric conduction from any one of the first power-receiving electrode and second power-receiving electrode to one electrode of the load, and electric conduction from the other electrode of the load to the other one of the first power-receiving electrode and second power-receiving electrode when, while the one of the first power-receiving electrode and second power-receiving electrode is placed in a manner opposed to the first power-transmitting electrode, the other one of the first power-receiving electrode and second power-receiving electrode is placed in a manner opposed to the second power-transmitting electrode, the connection means being further configured to enable electric conduction from the other one of the first power-receiving electrode and second power-receiving electrode to the one electrode of the load, and electric conduction from the other electrode of the load to the one of the first power-receiving electrode and second power-receiving electrode when, while the one of the first power-receiving electrode and second power-receiving electrode is placed in a manner opposed to the second power-transmitting electrode, the other one of the first power-receiving electrode and second power-receiving electrode is placed in a manner opposed to the first power-transmitting electrode.

6. The power supply system of claim 1, wherein:
the movable body further comprises a fourth capacitor and fourth coil connected to each other in parallel in such a manner that the fourth capacitor and fourth coil are laid parallel to the first capacitor, the first coil and the load;
the first and fourth coils are arranged in a manner that enables transformation of the voltages thereof due to mutual induction; and
the AC power supply supplies power to the load via the fourth coil under a condition that causes parallel resonance between the fourth capacitor and fourth coil.

7. A movable body to be placed in a power-consuming region and to supply power to a predetermined load, the power having been supplied from a fixed body placed in a power-supplying region, comprising:
a first power-receiving electrode and second power-receiving electrode, the first power-receiving electrode and second power-receiving electrode being a set of power-receiving electrodes to be placed in a manner opposed to and not contacting a first power-transmitting electrode or second power-transmitting electrode and with the interface, of the power-supplying region and power-consuming region, having the pair of power-receiving electrodes on one side and the first power-transmitting electrode and second power-transmitting electrode on the other side, the first power-transmitting electrode and second power-transmitting electrode being those arranged in the fixed body and to which AC power is supplied, wherein, while a first coupling capacitor is formed when one of the paired power-receiving electrodes is placed in a manner opposed to the first power-transmitting electrode, a second coupling capacitor is formed when the other one of the paired power-receiving electrodes is placed in a manner opposed to the second power-transmitting electrode; and
a first capacitor and first coil connected to each other in parallel between the first and second power-receiving electrodes,
wherein power is transmitted to the load via the first and second coupling capacitors under a condition that causes parallel resonance between the first capacitor and first coil.

8. A fixed body placed in a power-supplying region and configured to supply power to a predetermined load via a movable body placed in a power-consuming region, comprising:
a plurality of first power-transmitting electrodes and plurality of second power-transmitting electrodes, which form capacitors with at least one set of power-receiving electrodes arranged in the movable body when being placed in a manner opposed to and not contacting this pair of power-receiving electrodes and with the interface, of the power-supplying region and power-consuming region, having the pluralities of first power-transmitting electrodes and second power-transmitting electrodes on one side and the paired power-receiving electrodes on the other; and
an AC power supply to supply power to the first and second power-transmitting electrodes,
wherein the AC power supply transmits power to the load via the first and second coupling capacitors under a condition that causes parallel resonance between a first capacitor and first coil, which are connected to each other in parallel between the first and second power-receiving electrodes in the movable body.

9. The fixed body of claim 8, wherein the first power-transmitting electrodes and second power-transmitting electrodes are provided along the foregoing interface in such a manner that the respective first power-transmitting electrodes are side by side with the second power-transmitting electrodes.

* * * * *